US012802268B2

(12) United States Patent
Yamamoto

(10) Patent No.: US 12,802,268 B2
(45) Date of Patent: Nov. 17, 2026

(54) GENERATING CORRECTED TRAINING PATCHES FOR DETERMINING GRIP SUCCESS PROBABILITY OF ROBOT HAND

(71) Applicant: YAMAHA HATSUDOKI KABUSHIKI KAISHA, Iwata (JP)

(72) Inventor: Atsushi Yamamoto, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 244 days.

(21) Appl. No.: 18/691,523

(22) PCT Filed: Sep. 15, 2021

(86) PCT No.: PCT/JP2021/033962
§ 371 (c)(1),
(2) Date: Mar. 13, 2024

(87) PCT Pub. No.: WO2023/042306
PCT Pub. Date: Mar. 23, 2023

(65) Prior Publication Data

US 2024/0386606 A1 Nov. 21, 2024

(51) Int. Cl.
*G06T 7/73* (2017.01)
*B25J 9/16* (2006.01)
(Continued)

(52) U.S. Cl.
CPC ............... *G06T 7/74* (2017.01); *B25J 9/1697* (2013.01); *B25J 15/08* (2013.01); *G06T 7/11* (2017.01);
(Continued)

(58) Field of Classification Search
CPC ... G06T 7/74; G06T 7/11; G06T 2207/20081; G06T 2207/20084; G06T 2207/20132;
(Continued)

(56) References Cited

U.S. PATENT DOCUMENTS 10,970,855 B1 * 4/2021 Asif .......................... G06T 7/73
2015/0235351 A1 * 8/2015 Mirbach ................ G06T 7/593
382/154

(Continued)

FOREIGN PATENT DOCUMENTS

DE 102021133631 A1 * 7/2022 ............ G06N 3/045
JP 2013-052490 A 3/2013

(Continued)

OTHER PUBLICATIONS

C. Robinson, M. N. Saadatzi and D. O. Popa, “Bin-Picking using Model-Free Visual Heuristics and Grasp-Constrained Imaging,” 2019 IEEE 15th International Conference on Automation Science and Engineering (CASE), Vancouver, BC, Canada, 2019, pp. 1618-1624, doi: 10.1109/COASE.2019.8843334. (Year: 2019).*

(Continued)

*Primary Examiner* — Michael Robert Cammarata
(74) *Attorney, Agent, or Firm* — Studebaker Brackett PLLC

(57) ABSTRACT

If the patch image, referred to as a first patch image, cut from an image within the cutting range, referred to as a target range, set for one component is input to the alignment network unit, the correction amount for correcting the position of the cutting range for one component included in the patch image is output from the alignment network unit. Then, the image within the corrected cutting range obtained by correcting the cutting range by this correction amount is cut from the composite image, referred to as a stored component image, to generate the corrected patch image, referred to as a second patch image, including the one component, and the grip success probability is calculated for this corrected patch image.

15 Claims, 24 Drawing Sheets

(51) Int. Cl.

| | |
|---|---|
| ***B25J 15/08*** | (2006.01) |
| ***G06T 7/11*** | (2017.01) |
| ***G06V 10/764*** | (2022.01) |
| ***G06V 10/77*** | (2022.01) |
| ***G06V 10/82*** | (2022.01) |

(52) U.S. Cl.
CPC ........ *G06V 10/764* (2022.01); *G06V 10/7715* (2022.01); *G06V 10/82* (2022.01); *G06T 2207/10028* (2013.01); *G06T 2207/20076* (2013.01); *G06T 2207/20081* (2013.01); *G06T 2207/20084* (2013.01); *G06T 2207/20212* (2013.01); *G06V 2201/06* (2022.01)

(58) Field of Classification Search
CPC ........... G06T 2207/10028; G06T 2207/20212; G06V 10/7715; G06V 2201/06; G06V 10/82; B25J 15/08; B25J 13/08
See application file for complete search history.

(56) References Cited

U.S. PATENT DOCUMENTS

| | | | | |
|---|---|---|---|---|
| 2016/0283792 | A1 | 9/2016 | Okazaki | |
| 2017/0252924 | A1 | 9/2017 | Vijayanarasimhan et al. | |
| 2018/0037412 | A1* | 2/2018 | Lynch | B65G 1/137 |
| 2018/0174326 | A1* | 6/2018 | Katchalov | G06T 7/37 |
| 2018/0268601 | A1* | 9/2018 | Rad | G06V 20/647 |
| 2019/0005344 | A1* | 1/2019 | Tanabe | G06F 18/254 |
| 2019/0347761 | A1* | 11/2019 | Han | G06V 40/165 |
| 2020/0111206 | A1* | 4/2020 | Yati | G06T 7/0006 |
| 2021/0157998 | A1* | 5/2021 | Rodriguez | G06V 20/20 |
| 2022/0016767 | A1* | 1/2022 | Ku | B25J 9/1697 |
| 2022/0084238 | A1* | 3/2022 | Tang | G06T 7/11 |
| 2022/0414375 | A1* | 12/2022 | Krishnamurthy | H04N 23/90 |
| 2023/0245319 | A1* | 8/2023 | Nishida | G06V 10/454 382/155 |
| 2024/0238968 | A1* | 7/2024 | Shahapurkar | B25J 15/0066 |
| 2024/0346798 | A1* | 10/2024 | Yamamoto | G06T 7/55 |
| 2024/0386606 | A1* | 11/2024 | Yamamoto | G06T 7/11 |
| 2026/0061610 | A1* | 3/2026 | Cherian | B25J 9/1661 |

FOREIGN PATENT DOCUMENTS

| | | | | |
|---|---|---|---|---|
| JP | 2017030135 A | * 2/2017 | | B25J 9/1694 |
| JP | 2017-185577 A | 10/2017 | | |
| JP | 2020-015141 A | 1/2020 | | |
| JP | 2020-532440 A | 11/2020 | | |

OTHER PUBLICATIONS

Pinto, Lerrel, and Abhinav Gupta. "Supersizing self-supervision: Learning to grasp from 50k tries and 700 robot hours." 2016 IEEE international conference on robotics and automation (ICRA). IEEE, 2016. (Year: 2016).*

S. Yu, D. -H. Zhai, H. Wu, H. Yang and Y. Xia, "Object recognition and robot grasping technology based on RGB-D data," 2020 39th Chinese Control Conference (CCC), Shenyang, China, 2020, pp. 3869-3874, doi: 10.23919/CCC50068.2020.9189078. (Year: 2020).*

Y. -H. Na, H. Jo and J. -B. Song, "Learning to grasp objects based on ensemble learning combining simulation data and real data," 2017 17th International Conference on Control, Automation and Systems (ICCAS), Jeju, Korea (South), 2017, pp. 1030-1034, doi: 10.23919/ICCAS.2017.8204368. (Year: 2017).*

G. C. Nandi, P. Agarwal, P. Gupta and A. Singh, "Deep Learning Based Intelligent Robot Grasping Strategy," 2018 IEEE 14th International Conference on Control and Automation (ICCA), Anchorage, AK, USA, 2018, pp. 1064-1069, doi: 10.1109/ICCA.2018.8444265. (Year: 2018).*

F. J. Chu, R. Xu, and P. A. Vela, "Real-world multiobject, multigrasp detection," IEEE Robot. Autom. Lett., vol. 3, No. 4, pp. 3355-3362, Oct. 2018, doi: 10.1109/LRA.2018.2852777. (Year: 2018).*

M. U. Khalid, J. M. Hager, W. Kraus, M. F. Huber and M. Toussaint, "Deep Workpiece Region Segmentation for Bin Picking," 2019 IEEE 15th International Conference on Automation Science and Engineering (CASE), Vancouver, BC, Canada, 2019, pp. 1138-1144, doi: 10.1109/COASE.2019.8843050. (Year: 2019).*

Muslikhin, J. -R. Horng, S. -Y. Yang and M. -S. Wang, "Self-Correction for Eye-In-Hand Robotic Grasping Using Action Learning," in IEEE Access, vol. 9, pp. 156422-156436, 2021, doi: 10.1109/ACCESS.2021.3129474. (Year: 2021).*

J. J. van Vuuren, L. Tang, I. Al-Bahadly and K. Arif, "Towards the autonomous robotic gripping and handling of novel objects, " 2019 14th IEEE Conference on Industrial Electronics and Applications (ICIEA), Xi'an, China, 2019, pp. 1006-1010, doi: 10.1109/ICIEA.2019.8833691. (Year: 2019).*

Ghazaei, Ghazal, et al. "Dealing with ambiguity in robotic grasping via multiple predictions." Asian Conference on Computer Vision. Cham: Springer International Publishing, 2018. (Year: 2018).*

Berscheid et al.; "Improving Data Efficiency of Self-supervised Learning for Robotic Grasping"; 2019 International Conference on Robotics and Automation; IEEE; May 2019; pp. 1-7.

Matsumura et al.; "Learning Based Randomized Bin-picking Trained with Physics Simulator"; No. 17-2 Proceedings of the 2017 JSME Conference on Robotics and Mechatronics, Fukushima, Japan; May 10-13, 2017; pp. 1-4; partial English translation.

International Search Report issued in PCT/JP2021/033962; mailed Dec. 7, 2021.

Office Action issued in DE 11 2021 008 230.2; mailed by the German Patent and Trademark Office on Aug. 13, 2025.

* cited by examiner

PATCH IMAGE INFORMATION

| LABEL | POSITION OF CUTTING RANGE Rc | PATCH IMAGE Ip |
| --- | --- | --- |
| 1 | (x, y, θ) |  |
| 2 | … | … |
| 3 | … | … |
| … | … | … |

CORRECTED PATCH IMAGE INFORMATION

| LABEL | POSITION OF CORRECTED CUTTING RANGE Rcc | CORRECTED PATCH IMAGE Ipc |
| --- | --- | --- |
| 1 | (x+Δx, y+Δy, θ+Δθ) |  |
| 2 | … | … |
| 3 | … | … |
| … | … | … |

GRIP SUCCESS PROBABILITY INFORMATION

| LABEL | POSITION OF CORRECTED CLIPPING RANGE Rcc | CORRECTED PATCH IMAGE Ipc | GRIP SUCCESS PROBABILITY |
|---|---|---|---|
| 1 | $(x+\Delta x, y+\Delta y, \theta+\Delta\theta)$ |  | 0.68 |
| 2 | ... | ... | ... |
| 3 | ... | ... | ... |
| ... | ... | ... | ... |
| | | | |

GENERATING CORRECTED TRAINING PATCHES FOR DETERMINING GRIP SUCCESS PROBABILITY OF ROBOT HAND

CROSS-REFERENCE TO RELATED APPLICATION

This application is a National Stage of International Patent Application No. PCT/JP2021/033962, filed Sep. 15, 2021, the entire contents of which is incorporated herein by reference.

BACKGROUND

Technical Field

This disclosure relates to a technique for gripping a plurality of components stored in a container by a robot hand and is particularly suitably applicable to bin picking.

Background Art

Improving Data Efficiency of Self-Supervised Learning for Robotic Grasping (2019) discloses a technique for calculating a grip success probability in the case of gripping a component by a robot hand in bin picking. Specifically, a patch image of a predetermined size including a target component is cut from a bin image captured by imaging a plurality of components piled up in a bin. Then, the grip success probability in the case of trying to grip the target component included in the patch image by the robot hand located at the position of this patch image (cutting position) is calculated. Such a grip success probability is calculated for each of different target components.

Further, position components of a robot gripping the component are present not only in a translation direction such as an X-direction or Y-direction, but also in a rotation direction. Accordingly, to reflect differences of rotational positions of the robot, a calculation is performed to rotate the bin image, whereby a plurality of bin images corresponding to mutually different angles are generated, and the patch image is cut and the grip success probability is calculated for each of the plurality of bin images.

SUMMARY

According to the above method, as many patch images as a product of the number of rotation angles of the robot hand and the number of target components are obtained, and the grip success probability is calculated for each patch image. Thus, there has been a problem that a computation load becomes excessive.

This disclosure was developed in view of the above problem and aims to provide a technique capable of reducing a computation load required for the calculation of a grip success probability in the case of trying to grip a component by a robot hand.

An image processing device according to the disclosure, comprises an alignment unit configured to output a correction amount for correcting a position of a target range with respect to one component included in a first patch image when the first patch image is input, the target range being set for the one component, out of a plurality of components included in a stored component image representing the plurality of components stored in a container, the first patch image being cut from an image within the target range; a corrected image generator configured to generate a second patch image including the one component, the second patch image being an image within a range obtained by correcting the target range by the correction amount and cut from the stored component image; and a grip classifier configured to calculate a grip success probability in the case of trying to grip the one component included in the second patch image by a robot hand located in a range where the second patch image is set.

An image processing method according to the disclosure, comprises outputting a correction amount for correcting a position of a target range with respect to one component included in a first patch image when the first patch image is input, the target range being set for the one component, out of a plurality of components included in a stored component image representing the plurality of components stored in a container, the first patch image being cut from an image within the target range; generating a second patch image including the one component, the second patch image being an image within a range obtained by correcting the target range by the correction amount and cut from the stored component image; and calculating a grip success probability in the case of trying to grip the one component included in the second patch image by a robot hand located in a range where the second patch image is set.

In the image processing device and method thus configured, if the first patch image cut from the image within the target range set for one component is input, the correction amount for correcting the position of the target range for the one component included in the first patch image is output. Then, the second patch image including the one component, the second patch image being the image within the range obtained by correcting the target range by this correction amount and cut from the stored component image, is generated, and the grip success probability is calculated for this second patch image. Therefore, the second patch image including the component at the position where the one component can be gripped with a high success probability can be acquired based on the correction amount obtained from the first patch image. Thus, it is not necessary to calculate the grip success probability for each of a plurality of patch images corresponding to cases where the robot hand grips the one component at a plurality of mutually different positions (particularly rotational positions). In this way, it is possible to reduce a computation load required for the calculation of the grip success probability in the case of trying to grip the component by the robot hand.

The image processing device may be configured so that the alignment unit learns a relationship of the first patch image and the correction amount, using a position difference between a position determination mask representing a proper position of the component in the target range and the component included in the first patch image as training data. In such a configuration, the learning can be performed while a deviation of the component represented by the first patch image from a proper position is easily evaluated by the position determination mask.

The image processing device may be configured so that the alignment unit generates the position determination mask based on shape of the component included in the first patch image. In such a configuration, the learning can be performed using the proper position determination mask in accordance with the shape of the component.

The image processing device may be configured so that the alignment unit performs learning to update a parameter for specifying the relationship of the first patch image and the correction amount by error back propagation of an average square error between the position of the component included in the first patch image and the position of the position determination mask as a loss function. In such a configuration, the learning can be performed while the deviation of the component represented by the first patch image from the proper position is precisely evaluated by the average square error.

The image processing device may be configured so that the alignment unit repeats the learning while changing the first patch image. In such a configuration, a highly accurate learning result can be obtained.

Note that various conditions for finishing the learning can be assumed. For example, the image processing device may be configured so that the alignment unit finishes the learning if a repeated number of the learning reaches a predetermined number. The image processing device may be configured so that the alignment unit finishes the learning according to a situation of a convergence of the loss function.

The image processing device may be configured so that the grip classifier calculates the grip success probability from the second patch image using a convolutional neural network. Hereby, the grip success probability can be precisely calculated from the second patch image.

The image processing device may be configured so that the grip classifier weights a feature map output from the convolutional neural network by adding an attention mask to the feature map, and the attention mask represents to pay attention to a region extending in a gripping direction in which the robot hand grips the component and passing through a center of the second patch image and a region orthogonal to the gripping direction and passing through the center of the second patch image. Hereby, the grip success probability can be precisely calculated while taking the influence of the orientation of the component and a situation around the component (presence or absence of another component) on the grip by the robot hand into account.

The image processing device may further comprise: an image acquirer configured to acquire a luminance image representing the plurality of components and a depth image representing the plurality of components; and an image compositor configured to generate the stored component image by combining the luminance image and the depth image acquired by the image acquirer; and a patch image generator configured to generate the first patch image from the stored component image and inputting the first patch image to the alignment unit. In such a configuration, the composite image is generated by combining the luminance image and the depth image respectively representing the plurality of components. In the thus generated composite image, the shape of the component at a relatively high position, out of the plurality of components, easily remains and the composite image is useful in recognizing such a component (in other words, the component having a high grip success probability).

A component gripping system according to the disclosure, comprises: the image processing device; and a robot hand, the image processing device causing the robot hand to grip the component at a position determined based on the calculated grip success probability.

A component gripping method according to the disclosure, comprises: outputting a correction amount for correcting a position of a target range with respect to one component included in a first patch image when the first patch image is input, the target range being set for the one component, out of a plurality of components included in a stored component image representing the plurality of components stored in a container, the first patch image being cut from an image within the target range; generating a second patch image including the one component, the second patch image being an image in a range obtained by correcting the target range by the correction amount and cut from the stored component image; calculating a grip success probability in the case of trying to grip the one component included in the second patch image by a robot hand located in a range where the second patch image is set; and causing the robot hand to grip the component at a position determined based on the grip success probability.

In the component gripping system and method thus configured, it is not necessary to calculate the grip success probability for each of a plurality of patch images corresponding to cases where the robot hand grips the one component at a plurality of mutually different positions (particularly rotational positions). As a result, it is possible to reduce a computation load required for the calculation of the grip success probability in the case of trying to grip the component by the robot hand.

According to the disclosure, it is possible to reduce a computation load required for the calculation of a grip success probability in the case of trying to grip a component by a robot hand.

DETAILED DESCRIPTION

Figure 1:
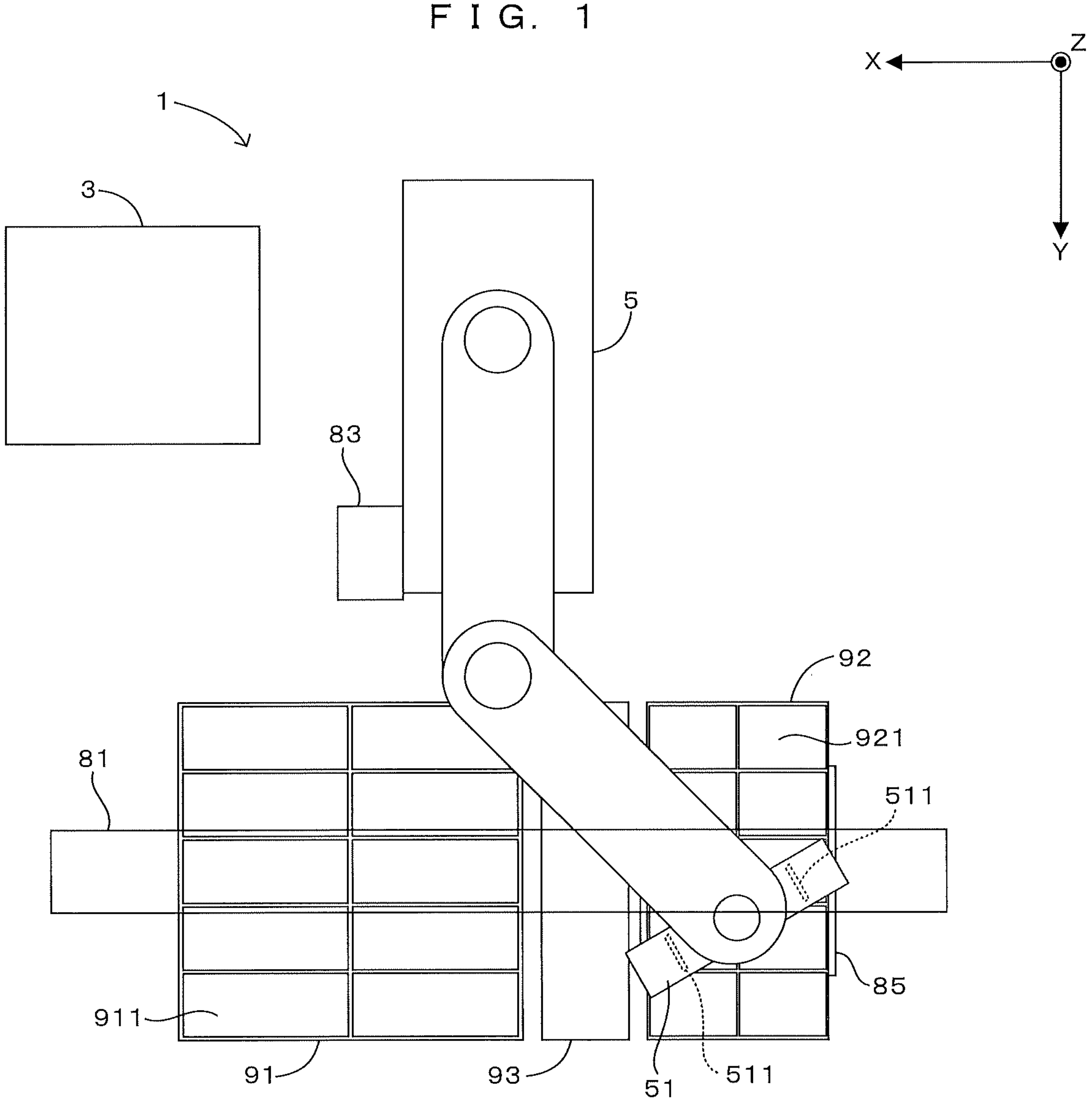
FIG. 1 is a plan view schematically showing an example of a component gripping system according to the disclosure.
Figure 2:
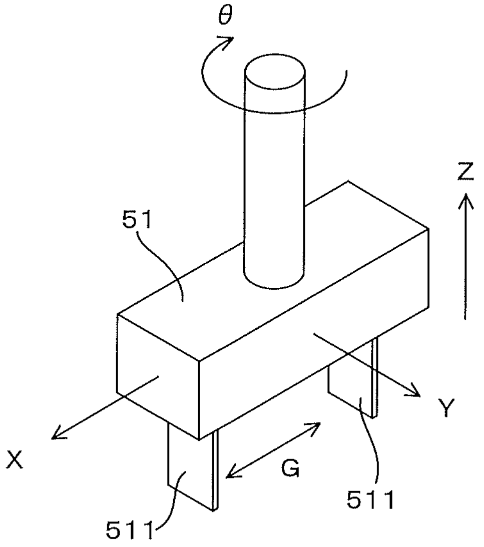
FIG. 2 is a perspective view schematically showing a robot hand used to grip a component in the component gripping system of FIG. 1.

FIG. 1 is a plan view schematically showing an example of a component gripping system according to the disclosure, and FIG. 2 is a perspective view schematically showing a robot hand used to grip a component in the component gripping system of FIG. 1. In these and following figures, an X-direction, which is a horizontal direction, a Y-direction, which is a horizontal direction orthogonal to the X-direction, and a Z-direction, which is a vertical direction, are shown as appropriate. These X-, Y- and Z-directions constitute a global coordinate system. As shown in FIG. 1, the component gripping system 1 comprises a control device 3 and a working robot 5, and the working robot 5 performs an operation (bin picking) based on a control by the control device 3.

Specifically, a component bin 91 and a kitting tray 92 are arranged in a work space of the working robot 5. The component bin 91 includes a plurality of compartmentalized storages 911 for storing components, and a multitude of components are piled up in each compartmentalized storage 911. The kitting tray 92 includes a plurality of compartmentalized storages 921 for storing the components, and a predetermined number of components are placed in each compartmentalized storage 921. The working robot 5 grips the component from the compartmentalized storage 911 of the component bin 91 (bin picking) and transfers the component to the compartmentalized storage 921 of the kitting tray 92. Further, a trash can 93 is arranged between the component bin 91 and the kitting tray 92 and, if a defective component is detected, the working robot 5 discards this defective component into the trash can 93.

The working robot 5 is a Scara robot having a robot hand 51 arranged on a tip, and transfers the component from the component bin 91 to the kitting tray 92 and discards the component into the trash can 93 by gripping the component by the robot hand 51 and moving the robot hand 51. This robot hand 51 has a degree of freedom in the X-direction, Y-direction and Z-direction and a θ-direction as shown in FIG. 2. Here, the θ-direction is a rotation direction centered on an axis of rotation parallel to the Z-direction. Further, the robot hand 51 includes two claws 511 arrayed in a gripping direction G, and each claw 511 has a flat plate shape orthogonal to the gripping direction G. The robot hand 51 can increase and decrease an interval between the two claws 511 in the gripping direction G, and grips the component by sandwiching the component in the gripping direction G by these claws 511. Note that although the gripping direction G is parallel to the X-direction in FIG. 2, the gripping direction G is possibly inclined with respect to the X-direction as a matter of course depending on the position of the robot hand 51 in the θ-direction.

Further, the component gripping system 1 comprises two cameras 81, 83 and a mass meter 85. The camera 81 is a plan view camera which images a multitude of components piled up in the compartmentalized storage 911 of the component bin 91 from the Z-direction (above), and faces the work space of the working robot 5 from the Z-direction. This camera 81 captures a gray scale image (two-dimensional image) representing an imaging target (components) by a luminance and a depth image (three-dimensional image) representing a distance to the imaging target. A phase shift method and a stereo matching method can be used as a specific method for obtaining a depth image. The camera 83 is a side view camera that images the component gripped by the robot hand 51 from the Y-direction, and is horizontally mounted on a base of the robot hand 51. This camera 83 captures a gray scale image (two-dimensional image) representing an imaging target (component) by a luminance. Further, the mass meter 85 measures the mass of the component placed in the compartmentalized storage 921 of the kitting tray 92.

Figure 3:
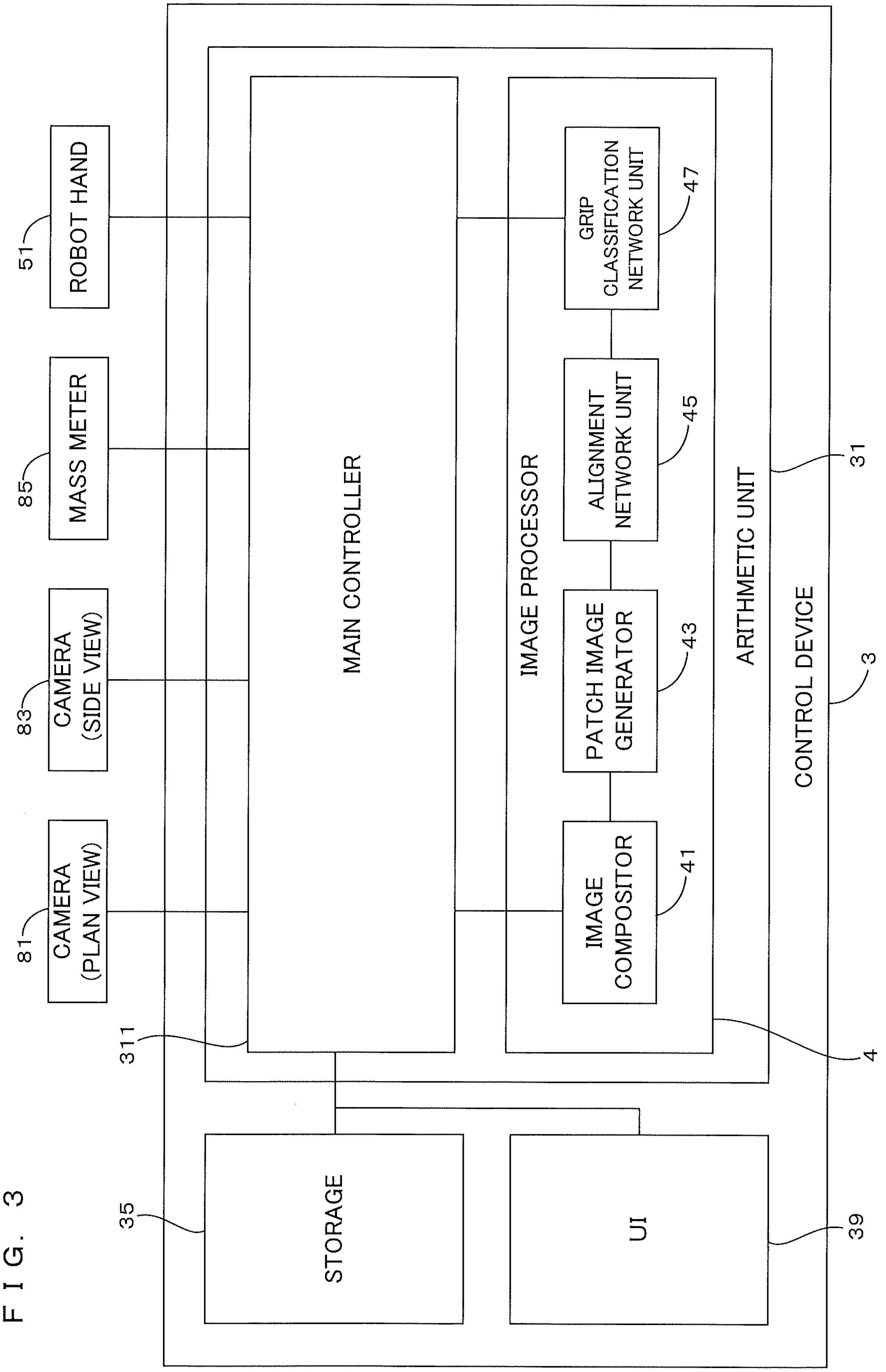
FIG. 3 is a block diagram showing an example of the electrical configuration of the control device.

FIG. 3 is a block diagram showing an example of the electrical configuration of the control device. The control device 3 is, for example, a personal computer provided with an arithmetic unit 31, a storage 35 and a UI (User Interface) 39. The arithmetic unit 31 is, for example, a processor provided with a CPU (Central Processing Unit) and the like and includes a main controller 311 and an image processor 4. These main controller 311 and image processor 4 are developed in the arithmetic unit 31 by implementing a predetermined program. The main controller 311 controls hardware including the aforementioned robot hand 51, cameras 81, 83 and mass meter 85, and the image processor 4 performs an image processing for recognizing the component supposed to be gripped by the robot hand 51. Particularly, the image processor 4 includes an image compositor 41, a patch image generator 43, an alignment network unit 45 and a grip classification network unit 47. Functions of these are described in detail later.

The storage 35 is a storage device such as a HDD (Hard Disk Drive) or SSD (Solid State Drive) and, for example, stores the program and data for developing the main controller 311 or the image processor 4 in the arithmetic unit 31. Further UI 39 includes an input device such as a keyboard or mouse and an output device such as a display, and transfers information input by an operator using the input device to the arithmetic unit 31 and the UI 39 and displays an image corresponding to a command from the arithmetic unit 31 on the display.

Figure 4A:
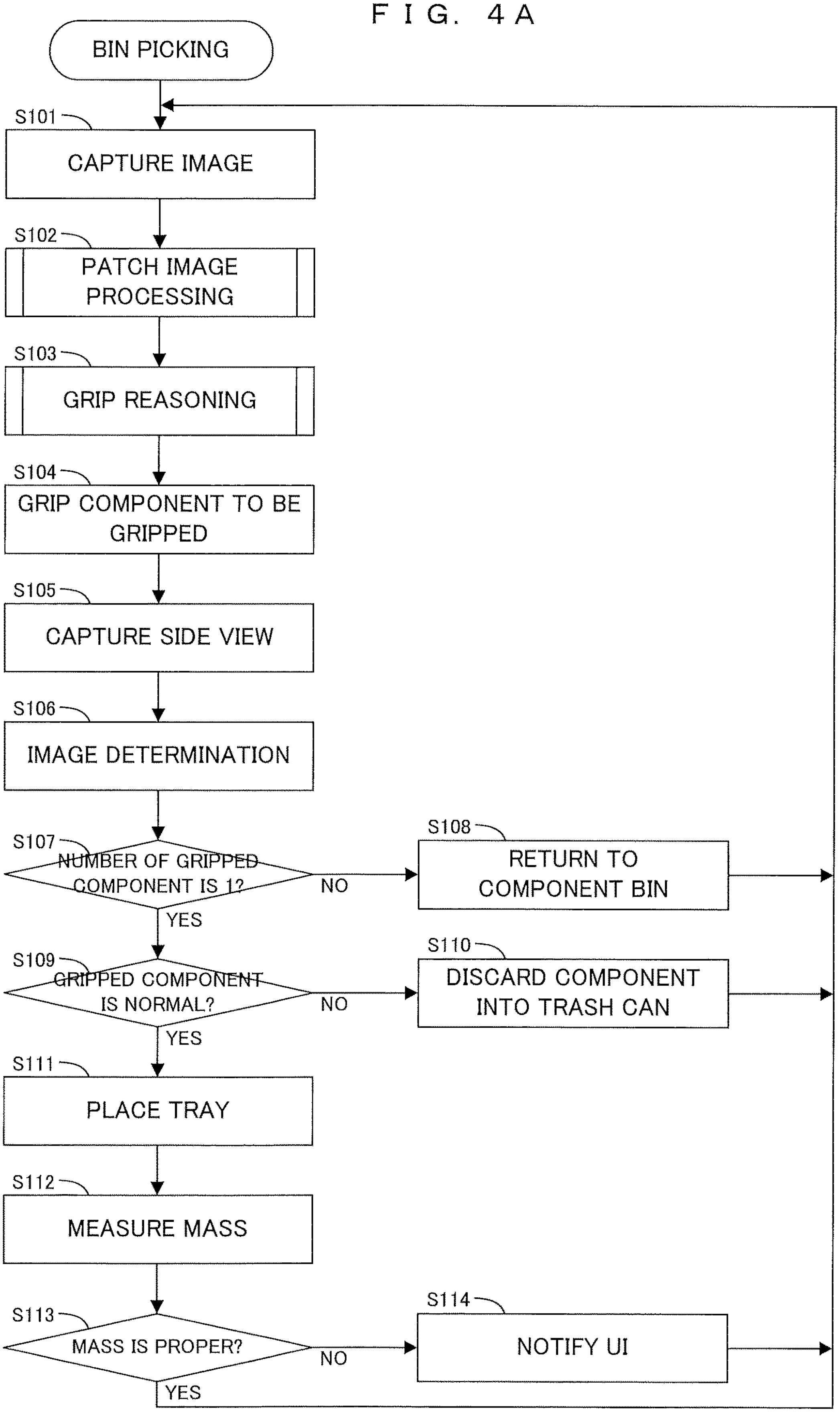
FIG. 4A is a flow chart showing an example of bin picking performed in the component gripping system of FIG. 1.
Figure 4B:
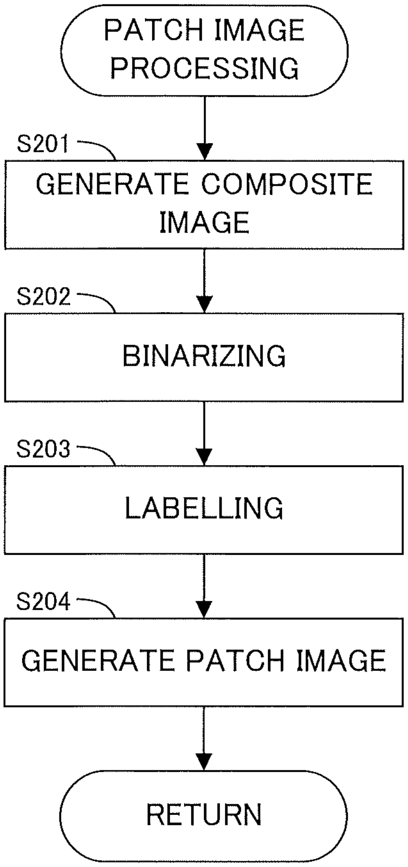
FIG. 4B is a flow chart showing an example of a patch image processing performed in bin picking of FIG. 4A.
Figure 4C:
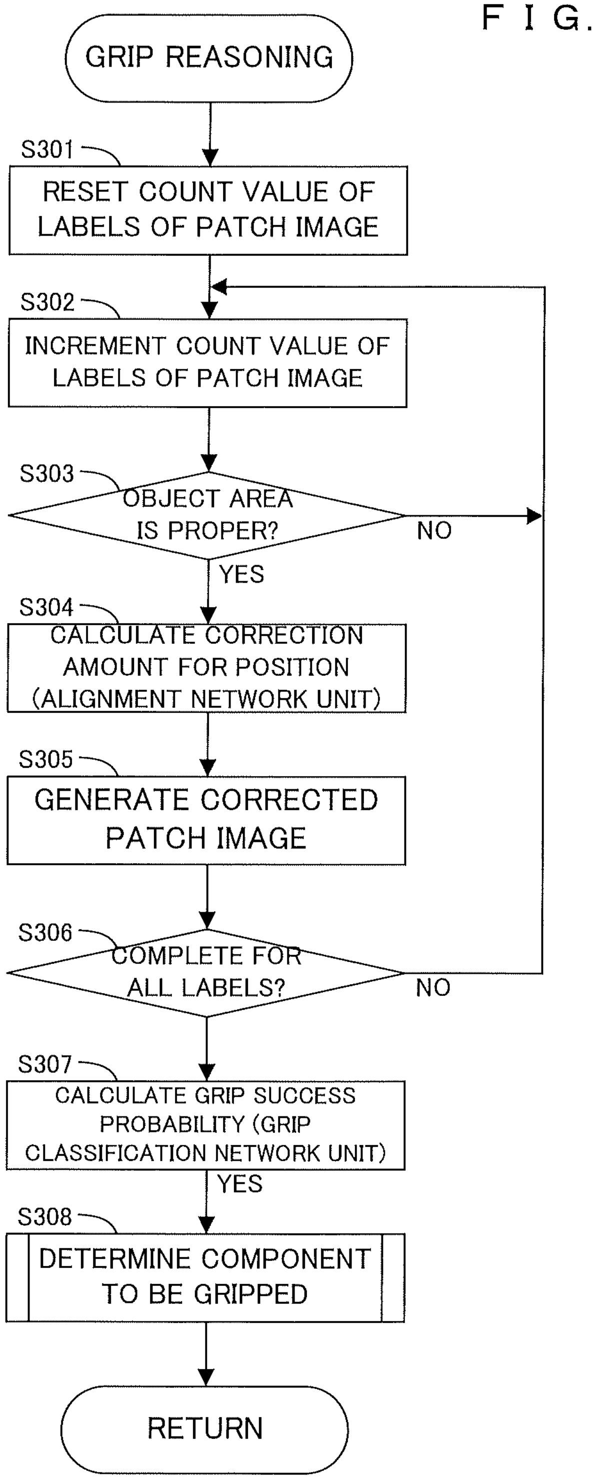
FIG. 4C is a flow chart showing an example of grip reasoning performed in bin picking of FIG. 4A.
Figure 4D:
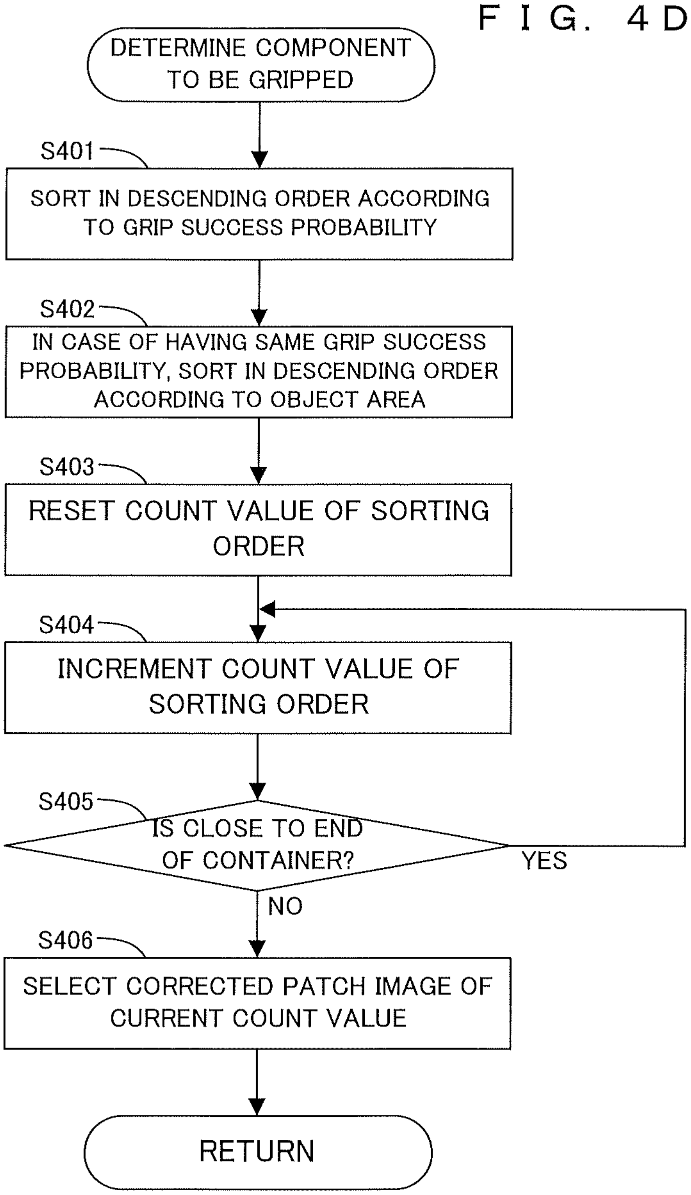
FIG. 4D is a flow chart showing an example of determination of the component to be gripped performed in the grip reasoning of FIG. 4C.

FIG. 4A is a flow chart showing an example of bin picking performed in the component gripping system of FIG. 1, FIG. 4B is a flow chart showing an example of a patch image processing performed in bin picking of FIG. 4A, FIG. 4C is a flow chart showing an example of grip reasoning performed in bin picking of FIG. 4A, and FIG. 4D is a flow chart showing an example of determination of the component to be gripped performed in the grip reasoning of FIG. 4C.

In Step S101 of bin picking of FIG. 4A, plan view images of a multitude of components piled up in the compartmentalized storages 911 of the component bin 91 are captured by the camera 81. A gray scale image Ig and a depth image Id are captured as the plan view images as described above. The main controller 311 transfers these images Id, Ig obtained from the camera 81 to the image compositor 41 of the image processor 4 and the image compositor 41 performs the patch image processing (Step S102).

Figure 5A:
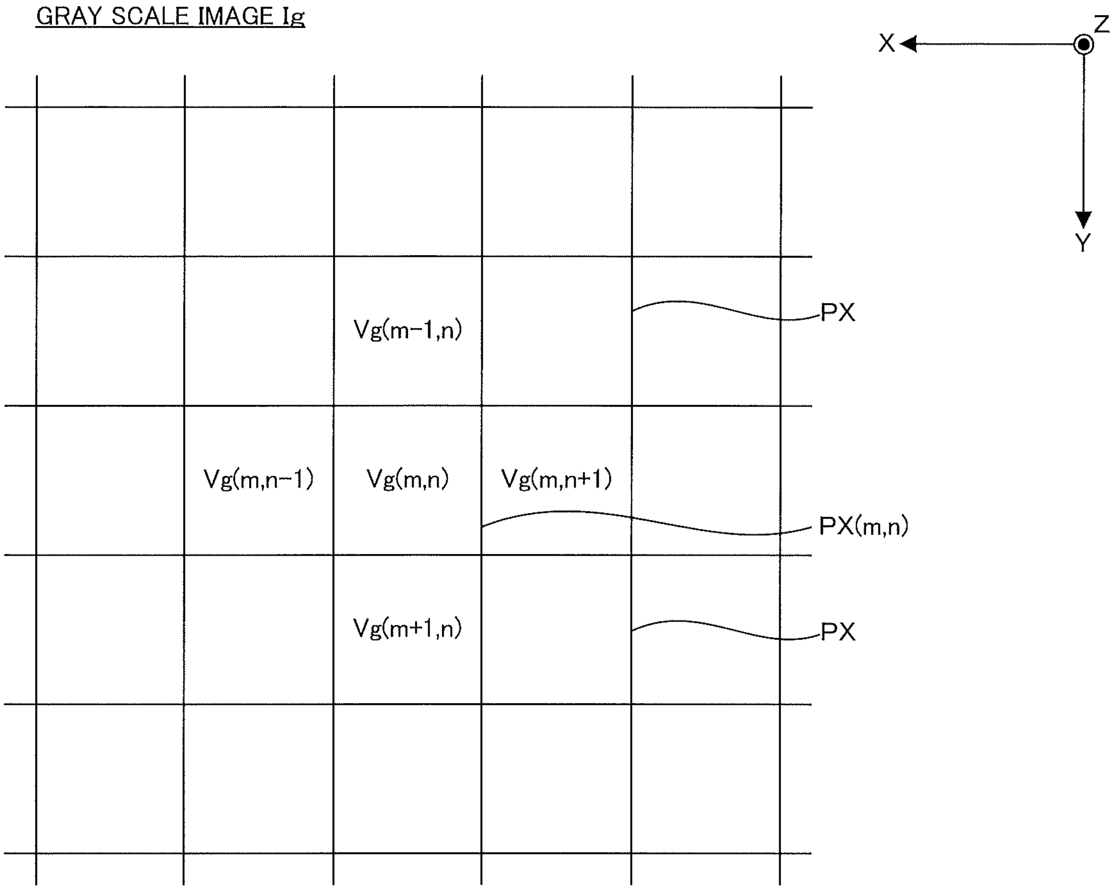
FIG. 5A is diagram schematically showing operations performed in the patch image processing of FIG. 4B.
Figure 5B:
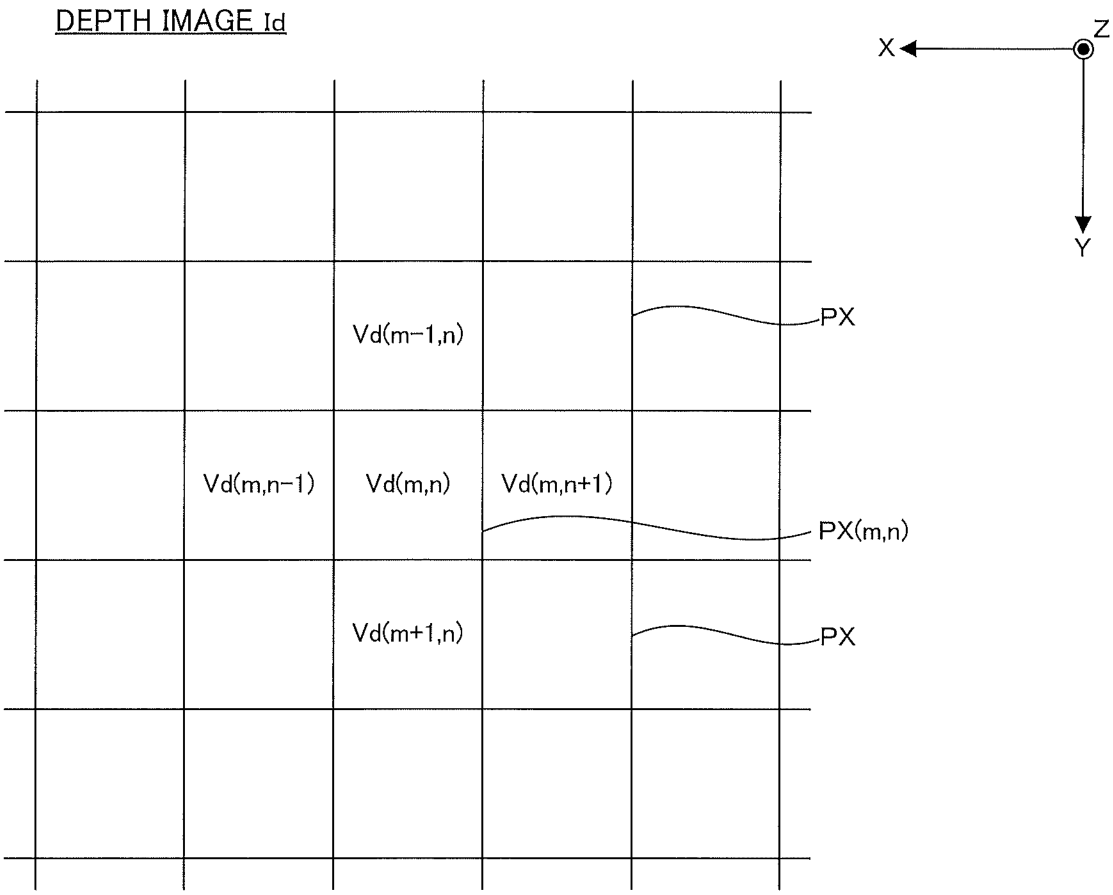
FIG. 5B is diagram schematically showing operations performed in the patch image processing of FIG. 4B.

FIGS. 5A to 5E are diagrams schematically showing operations performed in the patch image processing of FIG. 4B. In Step S201 of the patch image processing of FIG. 4B, the image compositor 41 generates a composite image Ic (FIG. 5C) by combining the gray scale image Ig (FIG. 5A) and the depth image Id (FIG. 5B).

As shown in FIG. 5A, the gray scale image Ig is image data composed of a plurality of pixels PX two-dimensionally arrayed in the X-direction and Y-direction and representing a luminance Vg of the pixel PX for each of the plurality of pixels PX. Note that, in FIG. 5A, notation is used which specifies one pixel PX by a combination (m, n) of "m" indicating a row number and "n" indicating a column number, and the pixel PX(m, n) of the gray scale image Ig has the luminance Vg(m, n). Note that the luminance Vg(m, n) has a larger value as a corresponding part is brighter.

As shown in FIG. 5B, the depth image Id is image data composed of a plurality of pixels PX similarly to the gray scale image Ig and representing a depth (distance) of the pixel PX for each of the plurality of pixels PX. Also in FIG. 5B, notation similar to that of FIG. 5A is used and the pixel PX(m, n) of the depth image Id has a depth Vd(m, n). Note that the depth Vd(m, n) has a larger value as a depth at a corresponding part is shallower (in other words, as the position of the facing part is higher).

Figure 5C:
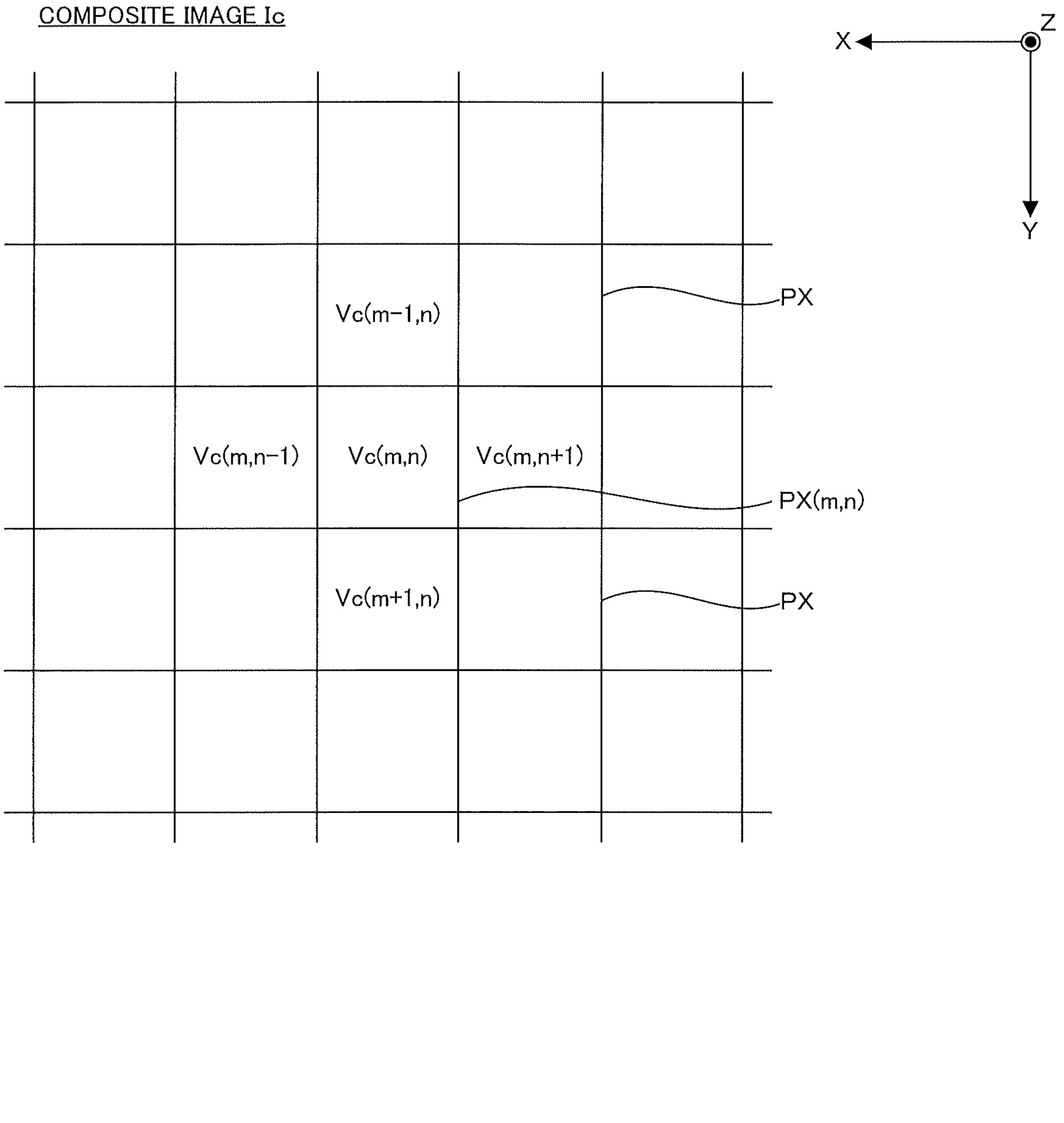
FIG. 5C is diagram schematically showing operations performed in the patch image processing of FIG. 4B.

As shown in FIG. 5C, the composite image Ic is image data composed of a plurality of pixels PX similarly to the gray scale image Ig and representing a composite value Vc of the pixel PX for each of the plurality of pixels PX. Also in FIG. 5C, notation similar to that of FIG. 5A is used and the pixel PX(m, n) of the composite image Ic has a composite value Vc(m, n).

Such a composite value Vc(m, n) is calculated based on the following equation:

$$Vc(m, n) = Vd(m, n) \times \left(1 + Vg(m, n)/\max(Vg)\right)$$

where max(Vg) is a maximum luminance among the luminances Vg included in the gray scale image Ig. That is, the composite value Vc is the luminance Vg weighted by the depth Vd and the composite image Ic is a depth-weighted gray scale image. Note that, in the above equation, the luminance Vg normalized at the maximum luminance is multiplied by the depth Vd (weight). However, normalization is not essential and the composite value Vc may be calculated by multiplying the luminance Vg by the depth Vd (weight). In short, the composite value Vc may be determined to depend on both the luminance Vg and the depth Vd.

Figure 5D:
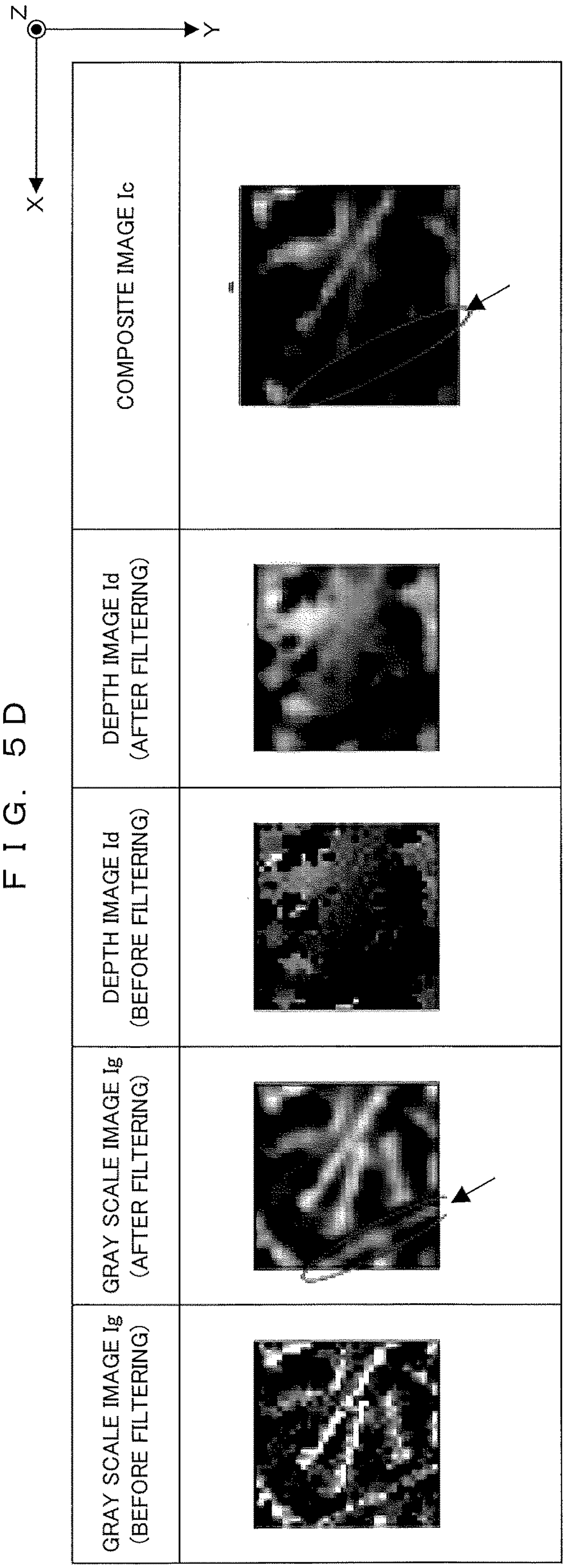
FIG. 5D is diagram schematically showing operations performed in the patch image processing of FIG. 4B.

In FIG. 5D, an experimental result of generating the composite image Ic from the gray scale image Ig and the depth image Id is shown. The gray scale image Ig (before filtering) is two-dimensional image data obtained by the camera 81, and the gray scale image Ig (after filtering) is two-dimensional image data having predetermined components (high-frequency components) of the two-dimensional image data obtained by the camera 81 removed by filtering. Further, the depth image Id (before filtering) is the three-dimensional image data obtained by the camera 81, and the depth image Id (after filtering) is three-dimensional image data having predetermined components (high-frequency components) of the three-dimensional image data obtained by the camera 81 removed by filtering. The composite image Ic is a depth-weighted gray scale image obtained by combining the gray scale image Ig and the depth image Id after filtering by the above equation. Here, if a range (elliptical range) designated by an arrow in each of fields of the "gray scale image Ig (after filtering)" and the "composite image Ic" is focused, the component clearly shown in the gray scale image Ig (after filtering) is not shown in the composite image Ic. This results from the fact that this component had a deep depth (in other words, low in height) and a small weight was given to the luminance Vg of this component. As just described, the combination of the gray scale image Ig and the depth image Id has an effect of emphasizing the component at a high position. Note that filtering used in FIG. 5D is not essential and similar effects can be obtained even if filtering is omitted as appropriate.

Figure 5E:
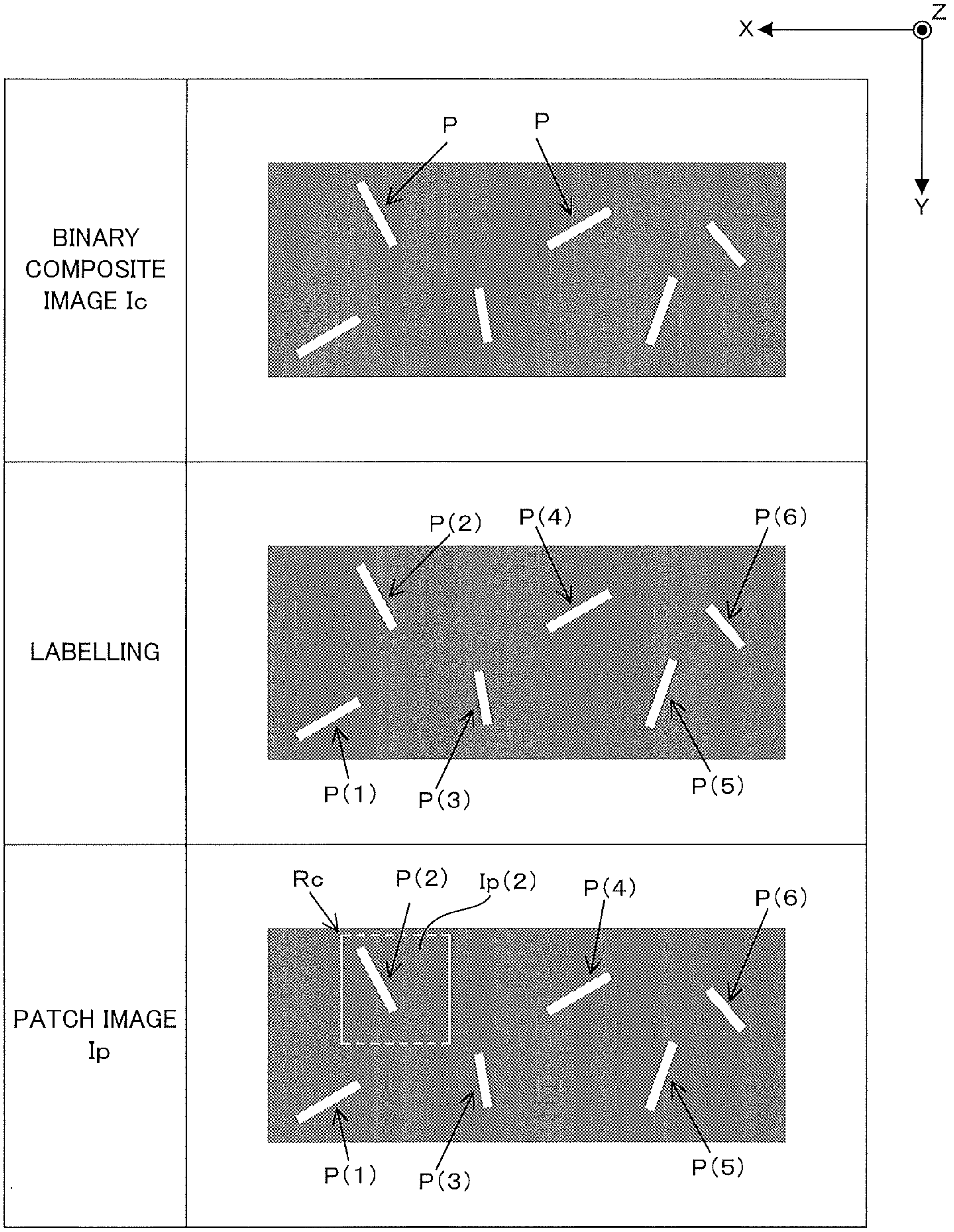
FIG. 5E is diagram schematically showing operations performed in the patch image processing of FIG. 4B.

The composite image Ic generated in Step S201 of FIG. 4B is output from the image compositor 41 to the patch image generator 43, and the patch image generator 43 performs image processings of Step S202 to S204 for the composite image Ic. Specific contents of these image processings are illustrated in FIG. 5E. In Step S202, a binary composite image Ic is obtained by binarizing the composite image Ic by a predetermined threshold. In this binary composite image Ic, a closed region having a high luminance (white) appears to correspond to the component. In other words, the closed region in the binary composite image Ic can be recognized as a component P. In Step S203, the patch image generator 43 performs labelling to associate mutually different labels (numbers) with the respective components P (closed regions Rc) of the binary composite image Ic.

In Step S204, a cutting range Rc for cutting an image including the component P from the binary composite image Ic is set. Particularly, the cutting range Rc is set to show the position of the robot hand 51 in gripping the component P. This cutting range Re is equivalent to a range to be gripped by the robot hand 51 (range to be gripped), and the robot hand 51 can grip the component P present in the cutting range Rc. For example, in field "Patch Image Ip" of FIG. 5E, parts corresponding to the two claws 511 of the robot hand 51 facing the component P(2) from above to grip the component P are represented by white solid lines (parallel to the Y-direction) of the cutting range Rc and movement paths of both ends of each claw 511 are represented by white broken lines (parallel to the X-direction). As is understood from this example, the claws 511 are parallel to the Y-direction and an angle of rotation of the robot hand 51 in the θ-direction is zero. That is, the cutting range Rc is set in a state where the angle of rotation of the robot hand 51 in the θ-direction is zero. Then, the patch image generator 43 acquires an image within the cutting range Rc as a patch image Ip from the binary composite image Ic (patch image generation). This patch image Ip is generated for each component P labelled in Step S203.

Figure 6A:
FIG. 6A is diagram schematically showing operations performed in the grip reasoning of FIG. 4C.

As shown in FIG. 4A, if the patch image processing of Step S102 is completed, the grip reasoning (FIG. 4C) of Step S103 is performed. FIGS. 6A to 6C and 7 are diagrams schematically showing operations performed in the grip reasoning of FIG. 4C. In starting the grip reasoning of FIG. 4C, patch image information (FIG. 6A) representing a plurality of the patch images Ip acquired by the patch image processing in Step S102 is output from the image compositor 41 to the alignment network unit 45. As shown in FIG. 6A, the patch image information represents the patch image Ip, the label number of this patch image Ip and the position of the cutting range Rc of this patch image Ip in association. The shape of the cutting range Rc is same for each patch image Ip, and the position of the cutting range Rc (cutting position) is specified by an X-coordinate, a Y-coordinate and a θ-coordinate of a geometric centroid of the cutting range Rc.

In contrast, in Step S301 of FIG. 4C, the alignment network unit 45 resets a count value for counting the labels of the plurality of patch images Ip represented by the patch image information to zero (Step S301) and increments this count value (Step S302).

In Step S303, the alignment network unit 45 determines whether or not an area of an object (white closed region) included in the patch image Ip of the current count value is proper. Specifically, the object area is compared to each of a lower threshold and an upper threshold larger than the lower threshold. If the object area is smaller than the lower threshold or larger than the upper threshold, the object area is determined not to be proper ("NO" in Step S303) and return is made to Step S302. On the other hand, if the object area is equal to or larger than the lower threshold and equal to or lower than the upper threshold, the object area is determined to be proper ("YES" in Step S303") and advance is made to Step S304.

In Step S304, the alignment network unit 45 calculates a correction amount for correcting the position of the cutting range Rc based on the patch image Ip of the current count value. That is, the alignment network unit 45 includes an alignment neural network, and this alignment neural network outputs the correction amount (Δx, Δy, Δθ) of the cutting range Rc if the patch image Ip is input. A relationship of the patch image Ip and the correction amount of the cutting range Rc is described using FIG. 6C.

Figure 6B:
FIG. 6B is diagram schematically showing operations performed in the grip reasoning of FIG. 4C.
Figure 6C:
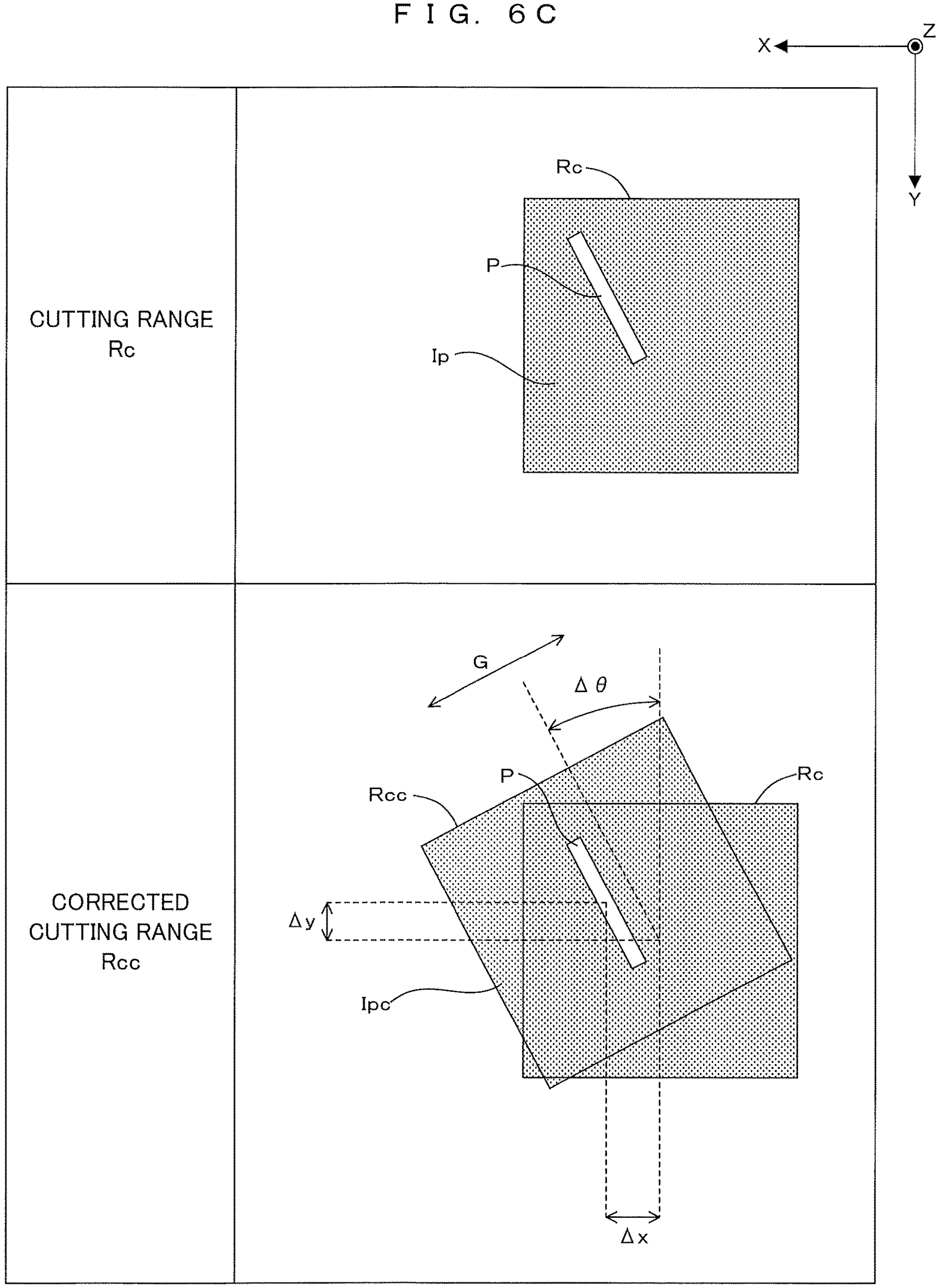
FIG. 6C is diagram schematically showing operations performed in the grip reasoning of FIG. 4C.

In field "Cutting Range Rc" of FIG. 6C, the cutting range Rc and the patch image Ip cut within the cutting range Rc are shown. In field "Corrected Cutting Range Rcc", a corrected cutting range Rc obtained by correcting the position of the cutting range Rc according to the correction amount (Δx, Δy, Δθ) is shown to be superimposed on the cutting range Rc and the patch image Ip. The cutting range Rc and the corrected cutting range Rcc have the same shape, and the cutting range Rc having each of the following operations performed therefor coincides with the corrected cutting range Rcc: Parallel movement in the X-direction by a correction distance Δx . . . X-direction parallel operation; Parallel movement in the Y-direction by a correction distance Δy . . . Y-direction parallel operation; and Rotational movement in the θ-direction by a correction angle Δθ . . . θ-direction rotation operation.

Further, a misalignment between a center of the corrected cutting range R and the component P is improved as compared to a misalignment between a center of the cutting range Rc and the component P. That is, the correction of the cutting range Rc is a correction for improving the misalignment between the cutting range Rc and the component P and further a correction for converting the cutting range Rc into the corrected cutting range Rcc so that the component P is centered. In response to the input of the patch image Ip, the alignment neural network of the alignment network unit 45 outputs the correction amount (Δx, Δy, Δθ) for correcting the cutting range Rc of this patch image Ip and calculating the corrected cutting range Rcc. Incidentally, a calculation of correcting the cutting range Rc by this correction amount and converting the cutting range Rc into the corrected cutting range Rcc can be performed by a product of a rotation matrix for rotating the cutting range Rc by Δθ in the θ-direction and a translation matrix for parallelly moving the cutting range Rc by Δy in the Y-direction while parallelly moving the cutting range Rc by Δx in the X-direction. Further, if the enlargement or reduction of the image needs to be considered, a scaling matrix may be further multiplied.

Note that if the component P has a shape long in a predetermined direction as in an example of FIG. 6C, it is preferable to perform centering such that a long axis direction of the component P is orthogonal to the gripping direction G of the robot hand 51. In this way, the component P can be precisely gripped by the robot hand 51.

In Step S305, the alignment network unit 45 generates the corrected cutting range Rcc by correcting the cutting range Rc based on the correction amount output by the alignment neural network and acquires an image within the corrected cutting range Rcc from the binary composite image Ic, as a corrected patch image Ipc (corrected patch image generation). Steps S302 to S305 are repeated until Steps S302 to S305 are completed for all the labels (in other words, all the patch images Ip) included in the patch image information (unit "YES" in Step S306).

If the correction is completed for all the labels, corrected patch image information (FIG. 6B) representing a plurality of the corrected patch images Ipc is output from the alignment network unit 45 to the grip classification network unit 47. As shown in FIG. 6B, the corrected patch image information represents the corrected patch image Ipc, the label number of this corrected patch image Ipc and the position of the corrected cutting range Rcc of this corrected patch image Ipc in association. The shape of the corrected cutting range Rcc is same for each corrected patch image Ipc, and the position of the corrected cutting range Rc (cutting position) is specified by an X-coordinate, a Y-coordinate and a θ-coordinate of a geometric centroid of the corrected cutting range Rc.

Figure 7:
FIG. 7 is diagram schematically showing operations performed in the grip reasoning of FIG. 4C.

In Step S307, the grip classification network unit 47 calculate a grip success probability for each of the plurality of corrected patch images Ipc represented by the corrected patch image information. Specifically, a success probability (grip success probability) in the case of trying to grip the component P represented by the corrected patch image Ipc cut in the corrected cutting range Rcc with the robot hand 51 located at the position (x+Δx, y+Δy, θ+Δθ) of the corrected cutting range Rcc is calculated. That is, the grip classification network unit 47 includes a grip classification neural network and this grip classification neural network outputs the grip success probability corresponding to the corrected patch image Ipc if the corrected patch image Ipc is input. In this way, grip success probability information shown in FIG. 7 is acquired. As shown in FIG. 7, the grip success probability information represents the corrected patch image Ipc, the label number of this corrected patch image Ipc, the position of the corrected cutting range Rcc of this corrected patch image Ipc and the grip success probability of this corrected patch image Ipc in association. Note that the grip success probability is represented by a value of 0 to 1 in an example of FIG. 7, but may be represented in percentage.

In Step S308, the main controller 311 determines the component P to be gripped based on the grip success probability information output from the grip classification network unit 47. In the determination of the component to be gripped of FIG. 4D, the respective corrected patch images Ipc of the grip success probability information are sorted in a descending order according to the grip success probability (Step S401). That is, the corrected patch image Ipc having a higher grip success probability is sorted in higher order.

Further, for the corrected patch images Ipc having the same grip success probability, the corrected patch images Ipc are sorted in a descending order according to the object area included in the corrected patch image Ipc. That is, the corrected patch image Ipc having a larger object area is sorted in higher order. A count value of a sorting order is reset to zero in Step S403, and this count value is incremented in Step S404.

In Step S405, it is determined whether or not the component P included in the corrected patch image Ipc of the current count value is close to an end of the compartmentalized storage 911 (container) of the component bin 91. Specifically, the component P is determined to be close to the end of the container ("YES" in Step S405) if a distance between the position of the corrected cutting range Rcc, from which the corrected patch image Ipc was cut, and a wall surface of the compartmentalized storage 911 is less than a predetermined value, and return is made to Step S404. On the other hand, if this distance is equal to or more than the predetermined value, the component P is determined not to be close to the end of the container ("NO" in Step S405) and advance is made to Step S406. In Step S406, the corrected patch image Ipc of the current count value is selected as one corrected patch image Ipc representing the component P to be gripped. Then, return is made to the flow chart of FIG. 4A.

In Step S104 of FIG. 4A, the robot hand 51 is moved to the position represented by the corrected cutting range Rcc corresponding to the one corrected patch image Ipc selected in Step S103, and grips the component P represented by the one corrected patch image Ipc. An image of the component P gripped by the robot hand 51 is captured by the camera 83 in Step S105, and the main controller 311 determines the component P gripped by the robot hand 51 from the image captured by the camera 83 in Step S106. Further, the main controller 311 determines whether or not the number of the gripped component P is 1 (Step S107). If the number is not 1 ("NO" in Step S107), the robot hand 51 is caused to return these components P to the compartmentalized storage 911 of the component bin 91 (Step S108). Further, if the number of the gripped component P is 1 ("YES" in Step S107), the main controller 311 determines whether or not the gripped component P is normal (Step S109). If there is an abnormality such as a too small area representing the component P ("NO" in Step S109), the robot hand 51 is caused to discard this component P into the trash can 93 (Step S110).

On the other hand, if the component P is normal ("YES" in Step S109), the main controller 311 causes the robot hand 51 to place this component P in the compartmentalized storage 921 of the kitting tray 92 (Step S111). Subsequently, the main controller 311 measures the mass by the mass meter 85 (Step S112) and determines whether or not the mass indicated by the mass meter 85 is proper (Step S113). Specifically, determination can be made based on the mass corresponding to the components P placed on the kitting tray 92 is increasing. The main controller 311 notifies abnormality to the operator using the UI 39 if the mass is not proper ("NO" in Step S113), whereas the main controller 311 returns to Step S101 if the mass is proper ("YES" in Step S113).

The above is the content of bin picking performed in the component gripping system 1. In the above grip reasoning, the alignment network unit 45 calculates the correction amount (Δx, Δy, Δθ) for correcting the cutting range Rc based on the patch image Ip cut from the cutting range Rc. Particularly, the alignment network unit 45 calculates the correction amount of the cutting range Rc from the patch image Ip using the alignment neural network. Next, a method for causing this alignment neural network to learn the relationship of the patch image Ip and the correction amount of the cutting range Rc is described.

Figure 8A:
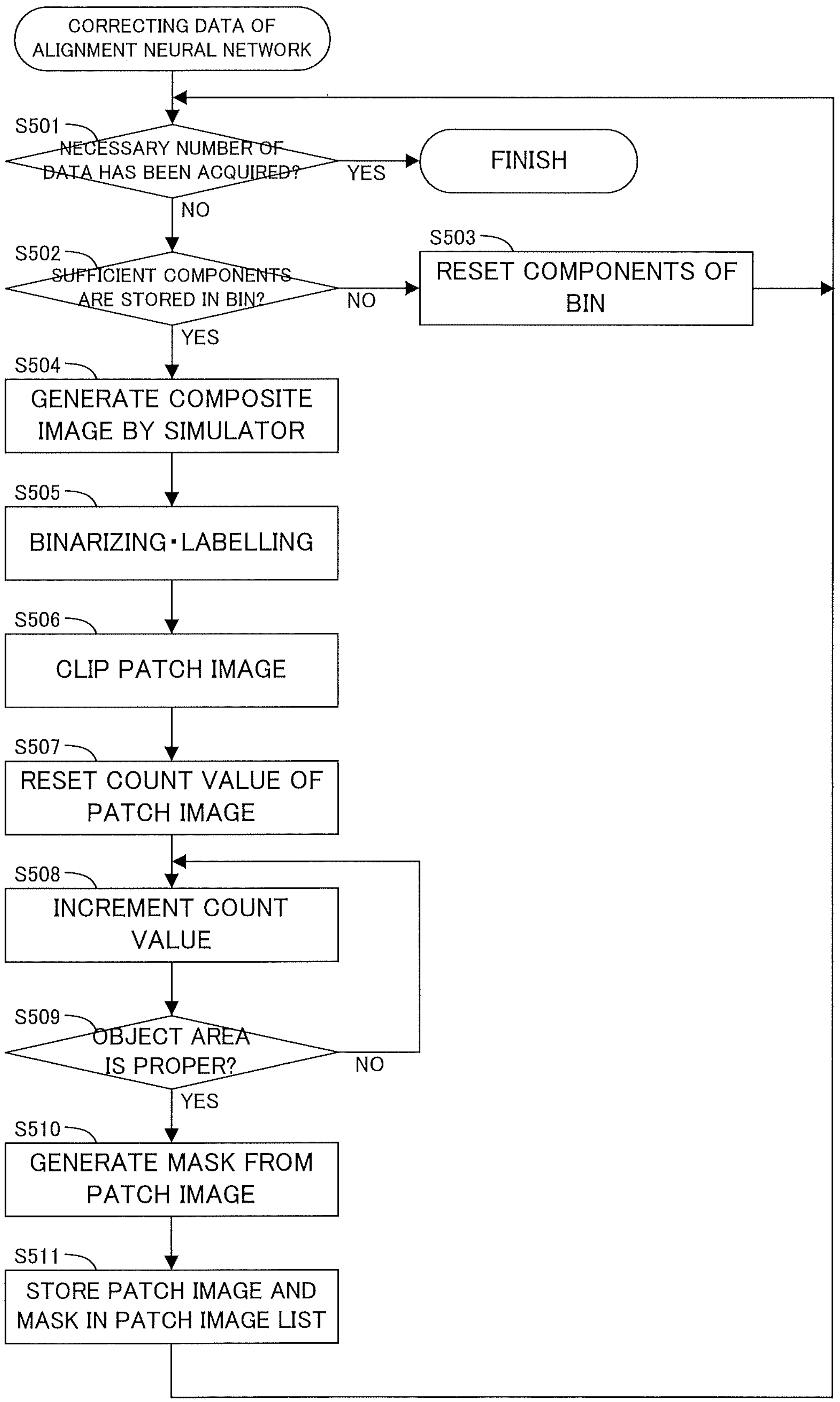
FIG. 8A is a flow chart showing an example of a method for collecting learning data of the alignment neural network.

FIG. 8A is a flow chart showing an example of a method for collecting learning data of the alignment neural network. This flow chart is performed by the arithmetic unit 31 of the control device 3. In performing this flow chart, a simulator for performing bin picking in a component gripping system 1 (hereinafter, referred to as a "virtual component gripping system 1" as appropriate) virtually constructed by calculation is constructed in the arithmetic unit 31. This simulator virtually performs an operation of the robot hand 51 to grip the component P from the compartmentalized storage 911 of the component bin 91 by calculation based on physical parameters such as a gravity acceleration and a friction coefficient.

In Step S501, it is confirmed whether or not a necessary number of pieces of data for learning has been acquired. This necessary number can be, for example, set in advance by the operator. The flow chart of FIG. 8A is finished if this necessary number of pieces of data have been already acquired ("YES" in Step S501), whereas advance is made to Step S502 if the number of acquired pieces of data is less than the necessary number ("NO" in Step S501).

In Step S502, it is determined whether or not sufficient components P are stored in the compartmentalized storage 911 of the component bin 91 arranged in the virtual component gripping system 1. Specifically, determination can be made based on whether or not the number of the components P is equal to or more than a predetermined number. If the number of the components P in the compartmentalized storage 911 of the component bin 91 is less than the predetermined number ("NO" in Step S502), the number of the components P in the compartmentalized storage 911 of the component bin 91 is increased to an initial value by being reset (Step S503) and return is made to Step S501. On the other hand, if the number of the components P in the compartmentalized storage 911 of the component bin 91 is equal to or more than the predetermined number ("YES" in Step S502), advance is made to Step S504.

In Step S504, a composite image Ic is generated in the virtual component gripping system 1 as in the case of the aforementioned real component gripping system 1. Subsequently, a binary composite image Ic is generated by binarizing this composite image Ic and labelling is performed for each component P included in this binary composite image Ic (Step S505). Then, a cutting range Rc is set for each of the labeled components P, and a patch image Ip is cut (Step S506).

A count value of counting the respective patch images Ip is reset in Step S507, and the count value is incremented in Step S508. Then, in a manner similar to the above, it is determined whether or not an area of an object (white closed region) included in the patch image Ip of the current count value is proper (Step S509). Return is made to Step S508 if the area of the object is improper ("NO" in Step S509), whereas advance is made to Step S510 if the area of the object is proper ("YES" in Step S509).

Figure 8B:
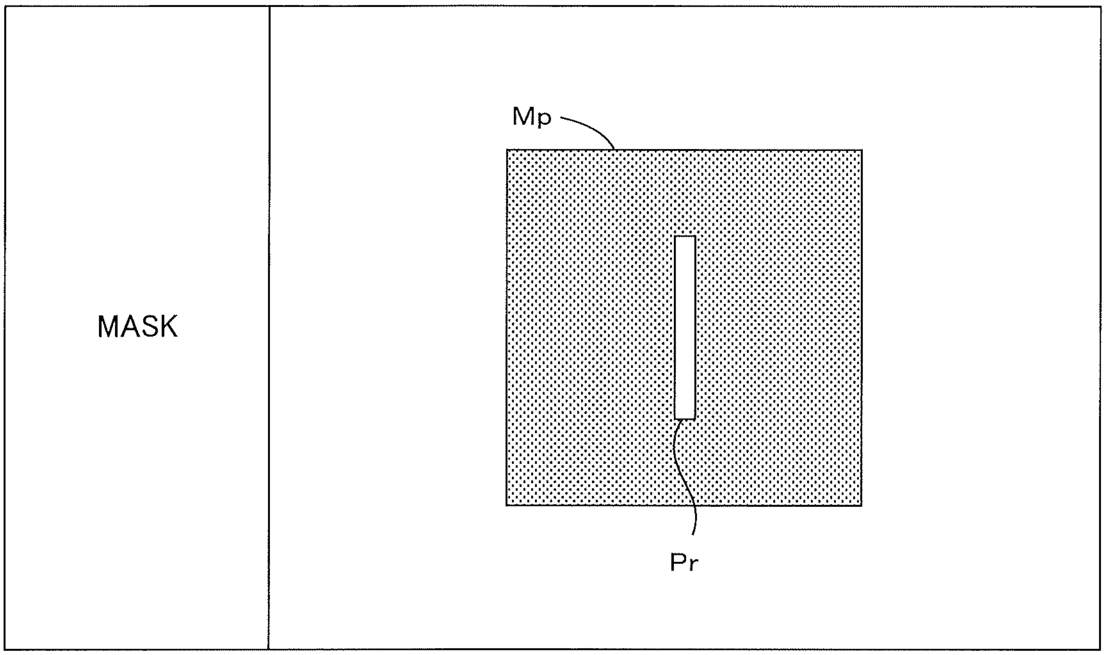
FIG. 8B is a diagram schematically showing an example of the position determination mask generated from the patch image.

If one patch image Ip having a proper area of the object is selected in this way, the main controller 311 generates a position determination mask Mp (FIG. 8B) from this one patch image Ip (Step S510). FIG. 8B is a diagram schematically showing an example of the position determination mask generated from the patch image. This position determination mask Mp has a contour having the same shape as the patch image Ip (in other words, the cutting range Rc), and a component reference pattern Pr having the same shape as the component P included in the patch image Ip is arranged in a center of the position determination mask Mp. This component reference pattern Pr is generated to have a pixel number in each of vertical and horizontal directions of the component P (in other words, the white closed region) included in the patch image Ip. This position determination mask Mp is a model of an ideal patch image Ip having the component P located in the center. Then, the patch image Ip is associated with the position determination mask Mp generated from this patch image Ip and stored in a patch image list (Step S511).

If the respective Steps up to Step S511 are completed in this way, return is made to Step S501. Steps S501 to S511 are repeatedly performed until the necessary number of pieces of data are acquired, i.e. until the number of pairs of the patch image Ip and the position determination mask Mp stored in the patch image list reaches the necessary number.

Figure 9A:
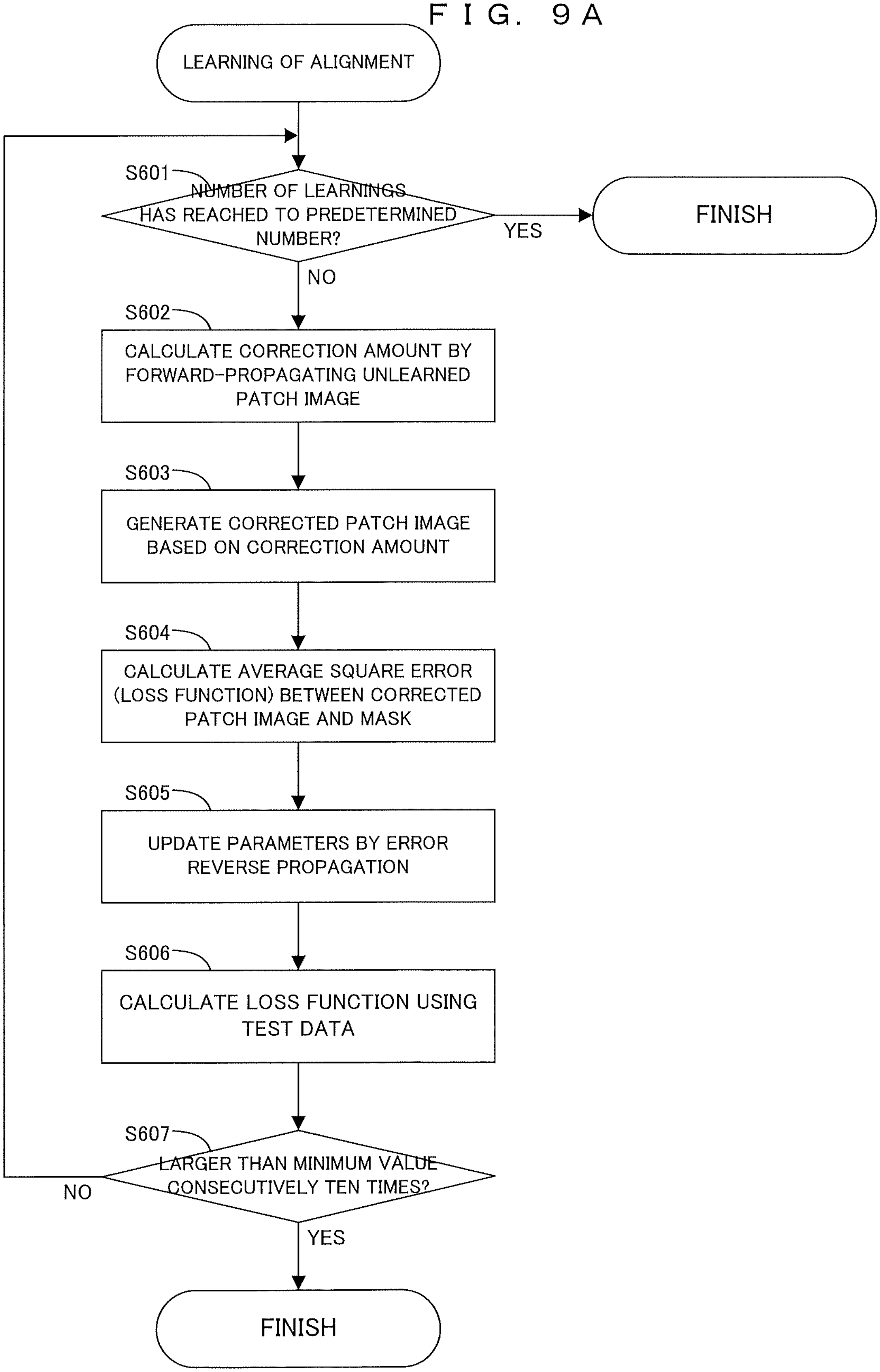
FIG. 9A is an example of a flow chart for causing the alignment neural network to learn the learning data collected in FIG. 8A.

FIG. 9A is an example of a flow chart for causing the alignment neural network to learn the learning data collected in FIG. 8A. This flow chart is performed by the arithmetic unit 31 of the control device 3. In Step S601, it is determined whether or not the number of learnings has reached a predetermined number. This predetermined number can be, for example, set in advance by the operator.

In Step S602, an unlearned patch image Ip selected from the patch image list is forward-propagated to the alignment neural network of the alignment network unit 45. Hereby, the correction amount (Δx, Δy, Δθ) corresponding to the patch image Ip is output from the neural network of the alignment network unit 45. Further, the alignment network unit 45 generates a corrected patch image Ipc by cutting the binary composite image Ic (generated in Step S505) within the corrected cutting range Rcc obtained by correcting the cutting range Rc by this correction amount (Step S603).

In Step S604, the alignment network unit 45 overlaps the position determination mask Mp corresponding to the patch image Ip selected in Step S602 and the corrected patch image Ipc such that the contours thereof coincide, and calculates an average square error between the component reference pattern Pr of the position determination mask Mp and the component P included in the corrected patch image Ipc as a loss function. Then, in Step S605, this loss function is back-propagated in the alignment neural network (error back propagation), thereby updating parameters of the alignment neural network.

Figure 9B:
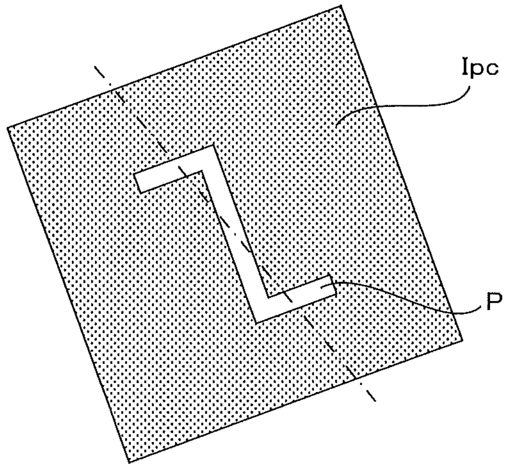
FIG. 9B is a diagram schematically showing an example in which the use of the mask is advantageous in calculating the loss function.

Note that the loss function can be calculated even without using the position determination mask Mp. That is, a main axis angle may be calculated from a moment of the image of the component P and an average square error between this main axis angle and a predetermined reference angle may be set as the loss function. On the other hand, in a case illustrated in FIG. 9B, the use of the position determination mask Mp is advantageous. FIG. 9B is a diagram schematically showing an example in which the use of the mask is advantageous in calculating the loss function. A component P included in a corrected patch image Ipc shown in FIG. 9B has a zigzag shape and it is difficult to properly obtain a main axis angle from a moment of an image of this component P. Therefore, the position determination mask Mp is used here from the perspective of dealing with components P of various shapes.

In Step S606, the patch image Ip (test data) secured for test in advance and not used in learning among the patch images Ip stored in the patch image list, is forward-propagated to the alignment neural network having the parameters updated, whereby the correction amount is calculated. Then, based on this correction amount, the loss function is calculated using the position determination mask Mp corresponding to this test data in the same manner as in Steps S603 to S604 described above.

The arithmetic unit 31 stores the loss function calculated in Step S606 every time Step S606 is performed, and calculates a minimum value of a plurality of the loss functions stored in this way. Then, the arithmetic unit 31 confirms whether the recently calculated loss function have updated the minimum value. Particularly, in Step S607, it is determined whether the minimum value has not been updated, i.e. whether the loss function larger than the minimum value has been calculated consecutively ten times. Return is made to Step S601 if the loss function equal to or less than the minimum value has been calculated in the past ten times ("NO" in Step S607), whereas the flow chart of FIG. 9A is finished if the loss function larger than the minimum value has been calculated consecutively ten times ("YES" in Step S607). Note that the number of times is not limited to ten times and can be changed as appropriate if necessary.

In the above grip reasoning, if the corrected patch image Ipc is input to the grip classification network unit 47, the grip classification network unit 47 calculates the grip success probability in the case of gripping the component P included in the corrected patch image Ipc by the robot hand 51 at the position represented by the corrected patch image Ipc. Particularly, the grip classification network unit 47 calculates the grip success probability from the corrected patch image Ipc, using the grip classification neural network. Next, a method for causing the grip classification neural network to learn a relationship of the corrected patch image Ipc and the grip success probability is described.

Figure 10A:
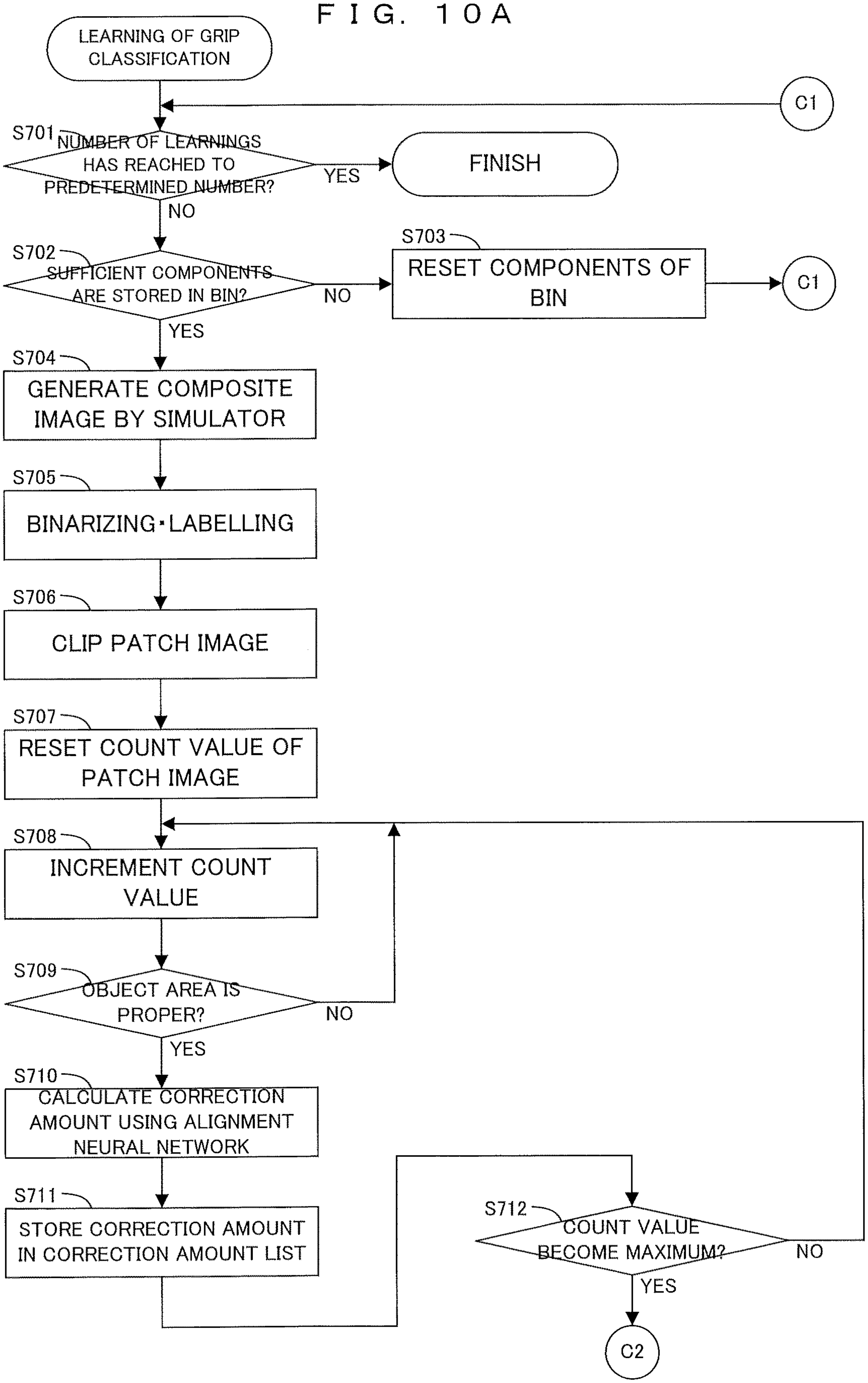
FIG. 10A is an example of a flow chart for causing the grip classification neural network to learn.
Figure 10B:
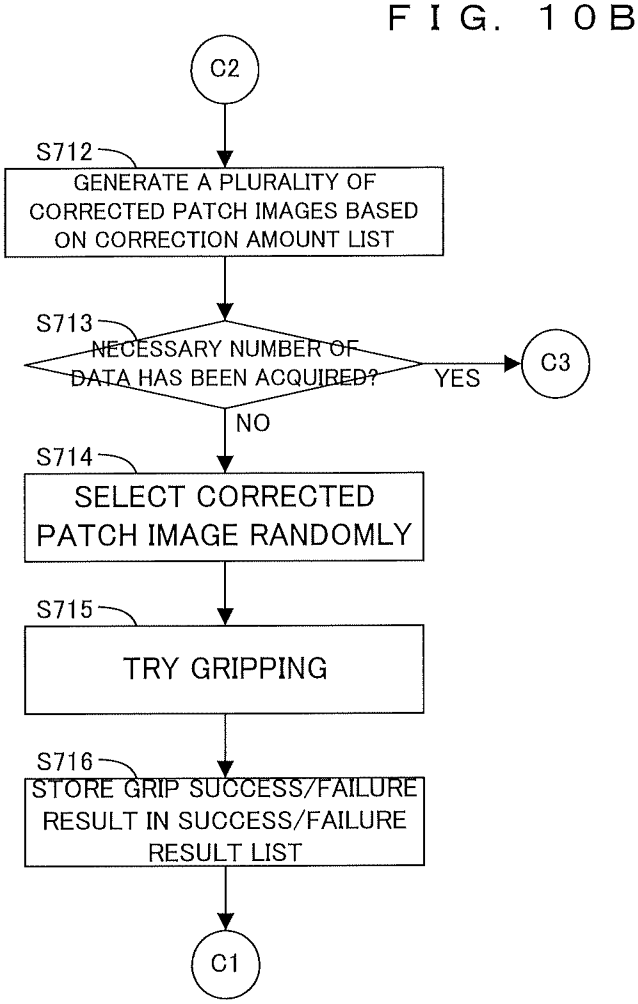
FIG. 10B is an example of a flow chart for causing the grip classification neural network to learn.
Figure 10C:
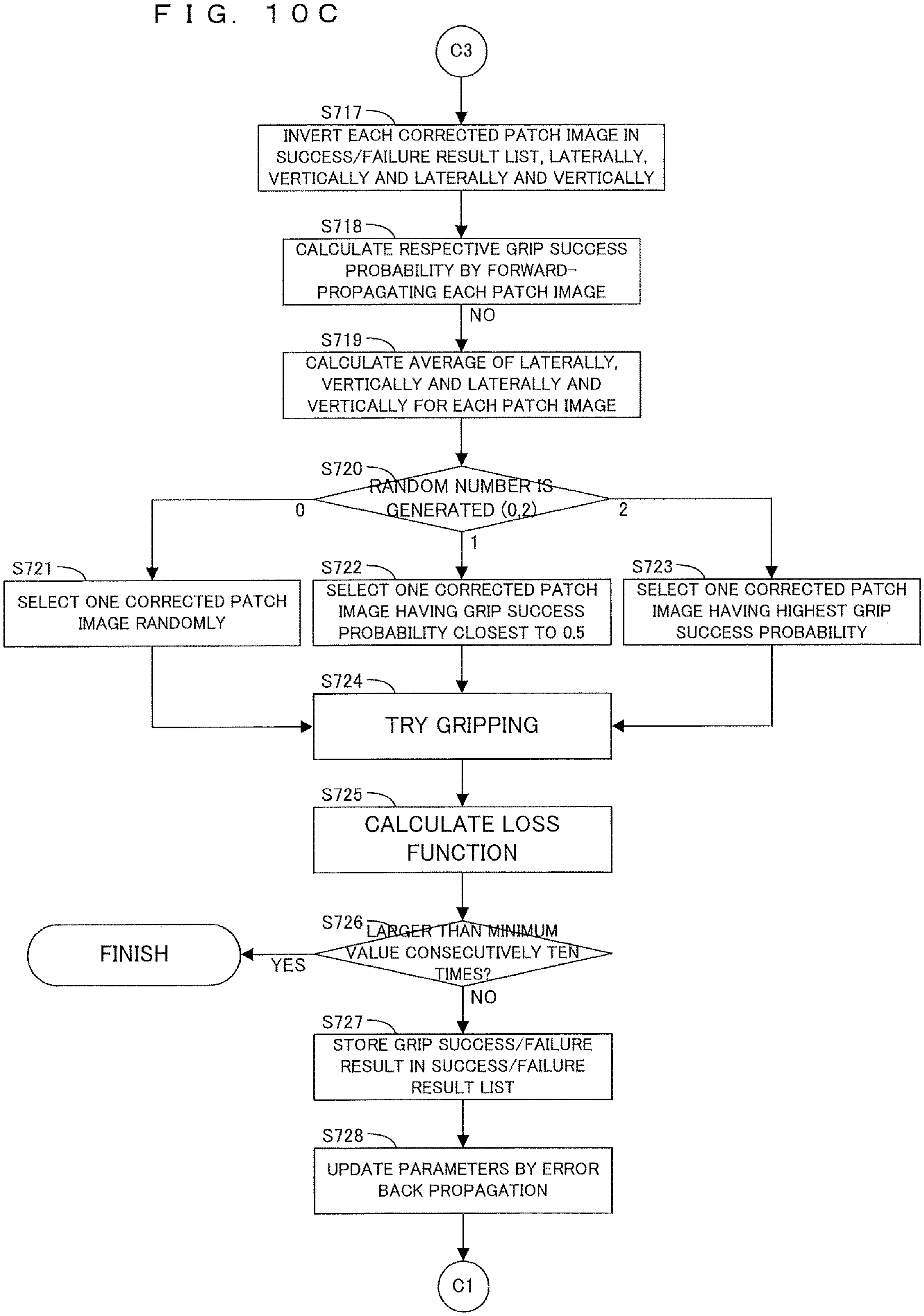
FIG. 10C is an example of a flow chart for causing the grip classification neural network to learn.

FIGS. 10A to 10C are an example of a flow chart for causing the grip classification neural network to learn. This flow chart is performed by the arithmetic unit 31 of the control device 3. Also in the learning of the grip classification neural network, a simulator for constructing a virtual component gripping system 1 is used as in the learning of the above alignment neural network.

In the flow chart of FIG. 10A, learning data is collected as in that of FIG. 8A. That is, Steps S701 to S709 of FIG. 10A are similar to Steps S501 to S509 of FIG. 8A except the following point. That is, in Step S701, not the acquired number of pieces of data, but whether or not the number of learnings has reached a predetermined number, is determined in Step S701. This predetermined number can be, for example, set in advance by the operator.

In the flow chart of FIG. 10A, if an one patch image Ip having a proper object area is selected by performing Steps S701 to S709, the alignment network unit 45 calculates a correction amount corresponding to the patch image Ip using the above learning completed alignment neural network (Step S710) and stores the patch image Ip and the correction amount in association in a correction amount list (Step S711). Steps S708 to S711 are repeated until a count value becomes maximum (until "YES" in Step S712), and pairs of the patch image Ip and the correction amount are successively stored in the correction amount list. If the count value becomes maximum ("YES" in Step S712), advance is made to Step S712 of FIG. 10B.

In Step S712, the alignment network unit 45 performs a process, which generates a corrected cutting range Rcc by correcting the cutting range Rc of the patch image Ip based on the correction amount and generates a corrected patch image Ipc based on the corrected cutting range Rcc, for each pair of the patch image Ip and the correction amount stored in the correction amount list. Hereby, a plurality of the corrected patch images Ipc are generated. Note that a specific procedure of generating the corrected patch image Ipc is as described above.

In Step S713, it is confirmed whether or not a necessary number of pieces of data for learning has been acquired. This necessary number can be, for example, set in advance by the operator. Advance is made to Step S717 to be described later (FIG. 10C) if this necessary number of pieces of data have been already acquired ("YES" in Step S713), whereas advance is made to Step S714 if the number of acquired pieces of data is less than the necessary number ("NO" in Step S713).

In Step S714, one corrected patch image Ipc is randomly (e.g. based on an output of a random number generator) is selected, out of a plurality of the corrected patch images Ipc generated in Step S712. Then, in Step S715, the grip of the component P included in the one corrected patch image Ipc is tried by the robot hand 51 located at the position of this one corrected patch image Ipc in the virtual component gripping system 1. Note that the position of the corrected patch image Ipc is equivalent to the position of the corrected cutting range Rcc, from which this corrected patch image Ipc was cut. Then, a success/failure result (1 in the case of a success, 0 in the case of a failure) of the grip trial is stored in a success/failure result list in association with the one corrected patch image Ipc (Step S716) and return is made to Step S701 of FIG. 10A.

On the other hand, if it is determined that the necessary number of pieces of data have been already acquired (YES) in Step S713, advance is made to Step S717 of FIG. 10C as described above. In Step S717, a laterally inverted corrected patch image Ipc obtained by laterally inverting the corrected patch image Ipc, a vertically inverted corrected patch image Ipc obtained by vertically inverting the corrected patch image Ipc and a vertically and laterally inverted corrected patch image Ipc obtained by laterally and vertically inverting the corrected patch image Ipc are generated. In this way, three types of images including the laterally inverted patch image Ipc, the vertically inverted patch image Ipc and the vertically and laterally inverted patch image Ipc are prepared for each corrected patch image Ipc in the success/failure result list. That is, three times as many corrected patch images Ipc as the corrected patch images Ipc stored in the success/failure result list are prepared.

In Step S718, each of the plurality of corrected patch images Ipc generated in Step S717 is forward-propagated in the grip classification neural network of the grip classification network unit 47 and a grip success probability is calculated for each corrected patch image Ipc. Then, in Step S719, an average value of grip success probabilities of the laterally inverted patch image Ipc, the vertically inverted patch image Ipc and the vertically and laterally inverted patch image Ip generated from the same corrected patch image Ipc is calculated. In this way, the average value of the grip success probabilities is calculated for each corrected patch image Ipc stored in the success/failure result list.

In Step S720, one value, out of "0", "1" and "2", is generated by a random number generator. If "0" is obtained by the random number generator, one corrected patch image Ipc is randomly selected, out of the respective corrected patch images Ipc having the grip success probabilities calculated therefor in Step S719 (Step S721). If "1" is obtained by the random number generator, one corrected patch image Ipc having the grip success probability closest to "0.5" (in other words, 50%) is selected, out of the respective corrected patch images Ipc (Step S722). If "2" is obtained by the random number generator, one corrected patch image Ipc having the highest grip success probability is selected, out of the respective corrected patch images Ipc (Step S723).

In Step S724, the grip of the component P represented by the one corrected patch image Ipc is tried by the robot hand 51 located at the position of this one corrected patch image Ipc in the virtual component gripping system 1. Then, a loss function is calculated based on the success/failure result (1 in the case of a success, 0 in the case of a failure) of the component grip and the average value of the grip success probabilities calculated for the one corrected patch image Ipc in Step S719. Various known functions such as a cross-entropy error can be used as the loss function.

The arithmetic unit 31 stores the loss function calculated in Step S725 every time Step S725 is performed, and calculates a minimum value, out of a plurality of the loss functions stored in this way. Then, the arithmetic unit 31 confirms whether the recently calculated loss function have updated the minimum value. Particularly, in Step S726, it is determined whether the minimum value has not been updated, i.e. whether the loss functions larger than the minimum value have been calculated consecutively ten times. If the loss function equal to or less than the minimum value has been calculated in the past ten times ("NO" in Step S726), the grip success/failure result of Step S724 is stored in the success/failure result list in association with the one corrected patch image Ipc (Step S727). Then, in Step S728, the loss function calculated in Step S725 is back-propagated in the grip classification neural network (error back propagation), whereby the parameters of the grip classification neural network are updated. On the other hand, if the loss function larger than the minimum value has been calculated consecutively ten times ("NO"), return is made to Step S701 of FIG. 10A. Note that the number of times is not limited to ten times and can be changed as appropriate if necessary.

In the embodiment described above, if the patch image Ip (first patch image) cut from an image within the cutting range Rc (target range) set for one component P is input to the alignment network unit 45, the correction amount (Δx, Δy, Δθ) for correcting the position of the cutting range Rc for one component P included in the patch image Ip is output from the alignment network unit 45 (Step S304). Then, the image within the corrected cutting range Rcc obtained by correcting the cutting range Rc by this correction amount (Δx, Δy, Δθ) is cut from the composite image Ic (stored component image) to generate the corrected patch image Ipc (second patch image) including the one component P (Step S305), and the grip success probability is calculated for this corrected patch image Ipc (Step S307). Accordingly, the corrected patch image Ipc including the component P at the position where the one component P can be gripped with a high success probability can be obtained based on the correction amount (Δx, Δy, Δθ) obtained from the patch image Ip. Thus, it is not necessary to calculate the grip success probability for each of the plurality of patch images Ip corresponding to the cases where the robot hand 51 grips the one component P at a plurality of mutually different positions (particularly rotational positions). In this way, it is possible to reduce the computation load required for the calculation of the grip success probability in the case of trying to grip the component P by the robot hand 51.

Further, the alignment network unit 45 (alignment unit) learns a relationship of the patch image Ip and the correction amount (Δx, Δy, Δθ) using a position difference between the position determination mask Mp representing a proper position of the component P in the cutting range Rc and the component P included in the patch image Ip as training data (Steps S601 to S607). In such a configuration, learning can be performed while a deviation of the component P represented by the patch image Ip from the proper position is easily evaluated by the position determination mask Mp.

Further, the alignment network unit 45 generates the patch image Ip based on the shape of the component P included in the patch image Ip (Step S510). In such a configuration, learning can be performed using the proper position determination mask Mp in accordance with the shape of the component P.

Further, the alignment network unit 45 performs learning to update the parameters specifying the relationship of the patch image Ip and the correction amount (Δx, Δy, Δθ) by error back propagation of an average square error between the position of the component P included in the patch image Ip and the position of the position determination mask Mp (the component reference pattern Pr) as a loss function (Step S604 to S605). In such a configuration, learning can be performed while the deviation of the component P represented by the patch image Ip from the proper position is precisely evaluated by the average square error.

Further, the alignment network unit 45 repeats learning while changing the patch image Ip (Step S601 to S607). In such a configuration, a highly accurate learning result can be obtained.

Note that various conditions for finishing learning can be assumed. In the above example, the alignment network unit 45 finishes learning when a repeated number of learning has reached the predetermined number (S601). Further, the alignment network unit 45 finishes learning according to a result of determining a situation of a convergence of the loss function in Step S607. Specifically, the loss function is determined to have converged and learning is finished if the minimum value of the loss function has not been updated consecutively a predetermined number of times (ten times).

Further, the main controller 311 (image acquirer) for acquiring the gray scale image Ig (luminance image) representing the plurality of components P and the depth image Id representing the plurality of components P and the image compositor 41 for generating the composite image Ic by combining the gray scale image Ig and the depth image Id acquired by the main controller 311 are provided. Then, the patch image generator 43 generates the patch image Ip from the composite image Ic and inputs the generated patch image Ip to the alignment network unit 45. That is, the composite image Ic is generated by combining the gray scale image Ig and the depth image Id respectively representing the plurality of components P. In the thus generated composite image Ic, the shape of the component P at a relatively high position among the plurality of components P, easily remains and the composite image Ic is useful in recognizing such a component (in other words, the component having a high grip success probability).

As just described, in the above embodiment, the component gripping system 1 corresponds to an example of a "component gripping system" of the disclosure, the control device 3 corresponds to an example of an "image processing device" of the disclosure, the main controller 311 corresponds to an example of an "image acquirer" of the disclosure, the image compositor 41 corresponds to an example of an "image compositor" of the disclosure, the patch image generator 43 corresponds to an example of a "patch image generator" of the disclosure, the alignment network unit 45 corresponds to an example of an "alignment unit" of the disclosure, the alignment network unit 45 corresponds to an example of a "corrected image generator" of the disclosure, the grip classification network unit 47 corresponds to an example of a "grip classifier" of the disclosure, the robot hand 51 corresponds to an example of a "robot hand" of the disclosure, the storage compartment 911 of the component bin 91 corresponds to an example of a "container" of the disclosure, the composite image Ip corresponds to an example of a "stored component image" of the disclosure, the depth image Id corresponds to an example of a "depth image" of the disclosure, the gray scale image Ig corresponds to an example of a "luminance image" of the disclosure, the patch image Ip corresponds to an example of a "first patch image" of the disclosure, the corrected patch image Ipc corresponds to an example of a "second patch image" of the disclosure, the position determination mask Mp corresponds to an example of a "position determination mask" of the disclosure, the component P corresponds to an example of a "component" of the disclosure, the cutting range Rc corresponds to an example of a "target range" of the disclosure, and the correction amount (Δx, Δy, Δθ) corresponds to an example of a "correction amount" of the disclosure.

Note that the disclosure is not limited to the above embodiment and various changes other than those described above can be made without departing from the gist of the disclosure. For example, in Step S105, the component P gripped by the robot hand 51 may be imaged by the camera 83 from mutually different directions to obtain a plurality of side view images. These side view images can be acquired by imaging the component P while rotating the robot hand 51 gripping the component P in the θ-direction. Hereby, the confirmation of the number of the components P in Step S107 and the confirmation of an abnormality (excessively small area) of the component P in Step S109 can be performed from a plurality of directions.

Figure 11:
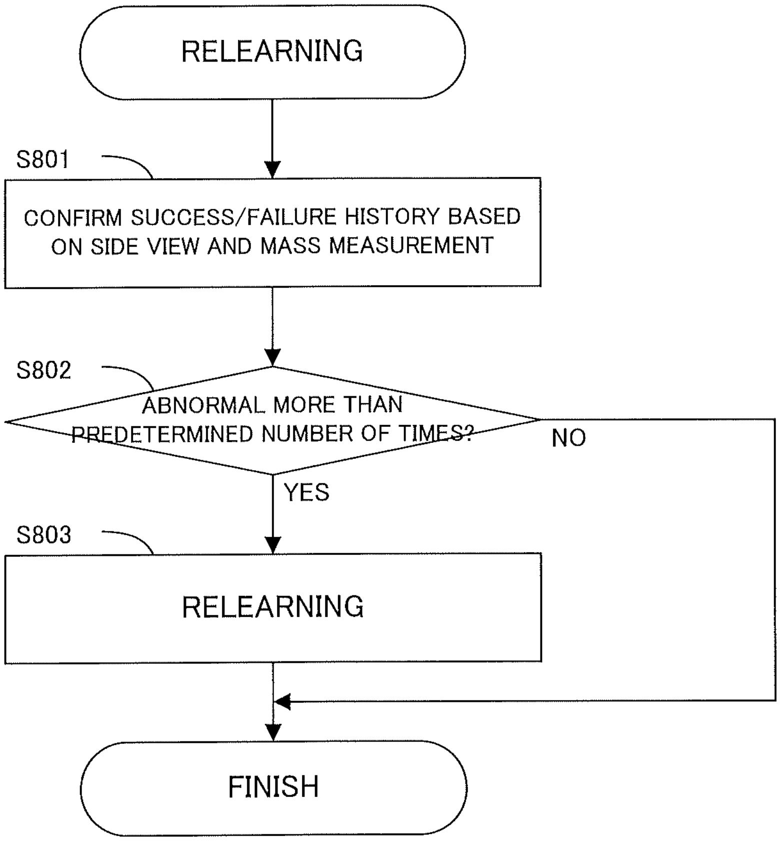
FIG. 11 is a flow chart showing an example of a method for relearning the grip classification neural network of the grip classification network unit.

Further, a flow chart of FIG. 11 may be performed for the learning of the grip classification neural network. Here, FIG. 11 is a flow chart showing an example of a method for relearning the grip classification neural network of the grip classification network unit. This flow chart is performed by the main controller 311, for example, at an end timing of planned bin picking or the like.

In Step S801, the main controller 311 confirms a history of detecting an abnormality based on a side view image ("NO" in Steps S107, S108) and an abnormality based on mass measurement ("NO" in Step S113) in bin picking performed in the past. If the number of abnormality detections is equal to or more than a predetermined number ("YES" in Step S802), the relearning of the grip classification neural network of the grip classification network unit 47 is performed (Step S803). In this relearning, the corrected patch images Ipc representing the components P detected to be abnormal and grip success/failure results (i.e. failures) are used as training data. Specifically, an error function is calculated based on a grip success probability and the grip success/failure result (failure) obtained by forward-propagating the corrected patch image Ipc in the grip classification neural network and this error function is back-propagated in the grip classification neural network, whereby the parameters of the grip classification neural network are updated (relearning).

That is, in an example of FIG. 11, the relearning of the grip classification neural network is performed based on a result of acquiring the grip state information (side view images, mass) for the component P gripped by the robot hand 51. In such a configuration, the relearning of the grip classification neural network is performed according to an actual success/failure result of the grip of the component P selected based on the grip success probability obtained for the corrected patch image Ipc, and the calculation accuracy of the grip success probability by the grip classification neural network can be improved.

Figure 12:
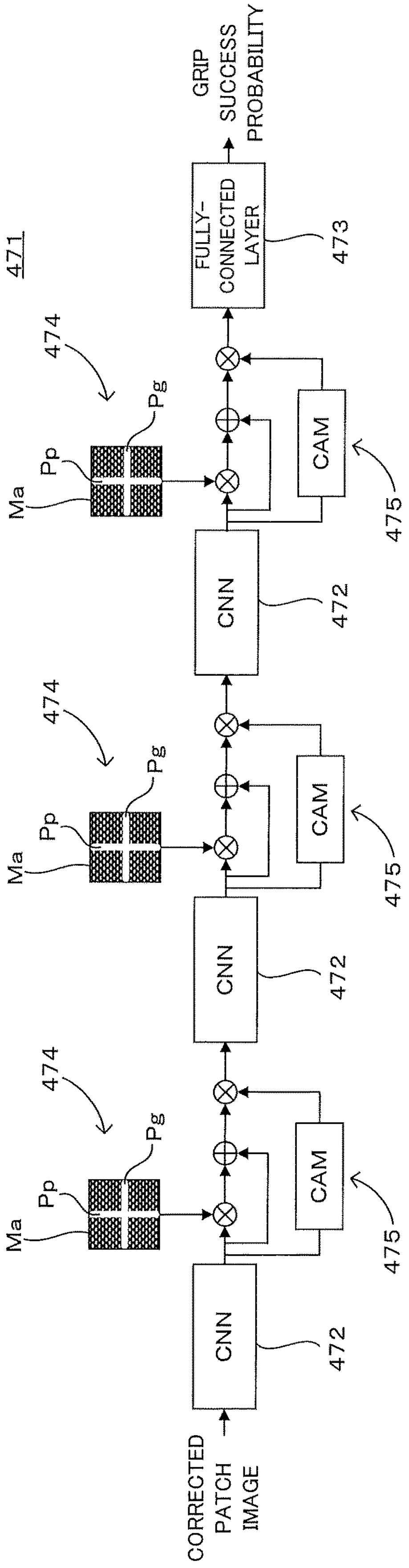
FIG. 12 is a modification of the grip classification neural network of the grip classification network unit.

FIG. 12 is a modification of the grip classification neural network of the grip classification network unit. In this grip classification neural network 471, multi-layer convolutional neural networks 472 and a fully-connected layer 473 are arrayed in series. Further, a space attention module 474 and a channel attention module 475 are provided on an output side of each convolutional neural network 472, and a feature map output from the convolutional neural network 472 is input to the next convolutional neural network 472 or the fully-connected layer 473 by way of weighting by the space attention module 474 and the channel attention module 475.

Particularly, an attention mask Ma added to the feature map by the space attention module 474 has two attention regions Pg, Pp passing through a center of the corrected patch image Ipc (in other words, the corrected cutting range Rcc). That is, in the attention mask Ma, weights of the attention regions Pg, Pp are larger than those of other regions, and these weights are added to the feature map. Here, the attention region Pg is parallel to the gripping direction G, and the attention region Pp is orthogonal to the gripping direction G. Particularly, if the long axis direction of the component P is orthogonal to the gripping direction G as in the above example, the attention region Pp is parallel to the long axis direction of the component P. That is, this attention mask Ma pays attention to the attention region Pp corresponding to an ideal position of the component P in the corrected patch image Ipc and the attention region Pg corresponding to approach paths of the claws 511 of the robot hand 51 with respect to this component P.

In the grip classification neural network, the attention mask Ma of such a configuration is added to the feature map output from the convolutional neural network 472 to weight the feature map. Therefore, an angle of the long axis direction of the component P with respect to the gripping direction G and a condition of a moving path of the robot hand 51 gripping the component P (presence or absence of another component) can be precisely reflected on judgement by the grip classification neural network.

That is, in this modification, the grip classification network unit 47 calculates the grip success probability from the corrected patch image Ipc using the convolutional neural network 472. In this way, the grip success probability can be precisely calculated from the corrected patch image Ipc.

Further, the grip classification network unit 47 weights the feature map by adding the attention mask Ma to the feature map output from the convolutional neural network 472. Particularly, the attention mask Ma represents to pay attention to the attention region Pg extending in the gripping direction G in which the robot hand 51 grips the component P and passing through the center of the corrected patch image Ipc and the attention region Pp orthogonal to the gripping direction G and passing through the center of the corrected patch image Ipc. In this way, the grip success probability can be precisely calculated while taking the influence of the orientation of the component P and a situation around the component P (presence or absence of another component P) on the grip by the robot hand 51 into account.

Further, the method for generating the composite image Ic is not limited to the example using the above equation, but the composite image Ic may be generated by another equation for calculating the composite value Vc of the composite image Ic by weighting the luminance Vg of the gray scale image Ig by the depth Vd of the depth image Id.

Further, in the above example, the composite image Ic is generated by combining the gray scale image Ig and the depth image Id. At this time, the composite image Ic may be generated by combining an inverted gray scale image Ig (luminance image) obtained by inverting the luminance of the gray scale image Ig and the depth image Id. Particularly, in the case of gripping a component P having a black plated surface, it is preferred to generate the composite image Ic using the inverted gray scale image Ig.

Further, the patch image Ip needs not be cut from the binarized composite image Ic, but the patch image Ip may be cut from the composite image Ic without performing binarization. The same applies also to the corrected patch image Ipc.

Further, various setting modes of the cutting range Rc for the component P in the patch image processing can be assumed. For example, the cutting range Rc may be set such that the geometric centroid of the cutting range Rc coincides with that of the component P. However, without being limited to this example, the cutting range Rc may be, in short, set to include the targeted component P.

Further, a specific configuration of the robot hand 51 is not limited to the above example. For example, the number of the claws 511 of the robot hand 51 is not limited to two, but may be three or more. Further, it is also possible to use a robot hand 51, which sucks by a negative pressure or magnetic force. Even in these cases, the cutting range Rc can be set in a range to be gripped by the robot hand 51 and the patch image Ip can be cut from the cutting range Rc.

Further, in the above embodiment, the patch image Ip is generated from the composite image Ic obtained by combining the gray scale image Ig and the depth image Id. However, the patch image Ip may be generated from one of the gray scale image Ig and the depth image Id, and the calculation of the correction amount ($\Delta x$, $\Delta y$, $\Delta\theta$) by the alignment network unit 45 and the calculation of the grip success probability by the grip classification network unit 47 may be performed based on this patch image Ip.

What is claimed is:

1. An image processing device comprising:

a processor configured to:

output a correction amount for correcting a position of a target range with respect to one component included in a first patch image when the first patch image is input, the target range being set for the one component, out of a plurality of components included in a stored component image representing the plurality of components stored in a container, the first patch image being cut from an image within the target range;

generate a second patch image including the one component, the second patch image being an image within a range obtained by correcting the target range by the correction amount and cut from the stored component image;

calculate a grip success probability in the case of trying to grip the one component included in the second patch image by a robot hand located in a range where the second patch image is set; and learn a relationship of the first patch image and the correction amount, using a position difference between a position determination mask representing a proper position of the component in the target range and the component included in the first patch image as training data.

2. The image processing device according to claim 1, wherein:

the processor is configured to generate the position determination mask based on shape of the component included in the first patch image.

3. The image processing device according to claim 1, wherein:

the processor is configured to perform learning to update a parameter for specifying the relationship of the first patch image and the correction amount by error back propagation of an average square error between the position of the component included in the first patch image and the position of the position determination mask as a loss function.

4. The image processing device according to claim 3, wherein:

the processor is configured to repeat the learning while changing the first patch image.

5. The image processing device according to claim 4, wherein:

the processor is configured to finish the learning if a repeated number of the learning reaches a predetermined number.

6. The image processing device according to claim 4, wherein:

the processor is configured to finish the learning according to a situation of a convergence of the loss function.

7. The image processing device according to claim 2, wherein:

the processor is configured to perform learning to update a parameter for specifying the relationship of the first patch image and the correction amount by error back propagation of an average square error between the position of the component included in the first patch image and the position of the position determination mask as a loss function.

8. The image processing device according to claim 1, wherein:

the processor is configured to calculate the grip success probability from the second patch image using a convolutional neural network.

9. The image processing device according to claim 2, wherein:

the processor is configured to calculate the grip success probability from the second patch image using a convolutional neural network.

10. The image processing device according to claim 1, further comprising:

an image acquirer configured to acquire a luminance image representing the plurality of components and a depth image representing the plurality of components;

an image compositor configured to generate the stored component image by combining the luminance image and the depth image acquired by the image acquirer; and a patch image generator configured to generate the first patch image from the stored component image and inputting the first patch image to the processor.

11. The image processing device according to claim 2, further comprising:

an image acquirer configured to acquire a luminance image representing the plurality of components and a depth image representing the plurality of components;

an image compositor configured to generate the stored component image by combining the luminance image and the depth image acquired by the image acquirer; and a patch image generator configured to generate the first patch image from the stored component image and inputting the first patch image to the processor.

12. A component gripping system, comprising:

the image processing device according to claim 1; and a robot hand, the image processing device being configured to cause the robot hand to grip the component at a position determined based on the calculated grip success probability.

13. A component gripping system, comprising:

the image processing device according to claim 2; and a robot hand, the image processing device being configured to cause the robot hand to grip the component at a position determined based on the calculated grip success probability.

14. An image processing device comprising:

a processor configured to:

output a correction amount for correcting a position of a target range with respect to one component included in a first patch image when the first patch image is input, the target range being set for the one component, out of a plurality of components included in a stored component image representing the plurality of components stored in a container, the first patch image being cut from an image within the target range;

generate a second patch image including the one component, the second patch image being an image within a range obtained by correcting the target range by the correction amount and cut from the stored component image;

calculate a grip success probability in the case of trying to grip the one component included in the second patch image by a robot hand located in a range where the second patch image is set;

calculate the grip success probability from the second patch image using a convolutional neural network; and weight a feature map output from the convolutional neural network by adding an attention mask to the feature map, and the attention mask represents to pay attention to a region extending in a gripping direction in which the robot hand grips the component and passing through a center of the second patch image and a region orthogonal to the gripping direction and passing through the center of the second patch image.

15. An image processing device comprising:

a processor configured to:

output a correction amount for correcting a position of a target range with respect to one component included in a first patch image when the first patch image is input, the target range being set for the one component, out of a plurality of components included in a stored component image representing the plurality of components stored in a container, the first patch image being cut from an image within the target range;

generate a second patch image including the one component, the second patch image being an image within a range obtained by correcting the target range by the correction amount and cut from the stored component image; and calculate a grip success probability in the case of trying to grip the one component included in the second patch image by a robot hand located in a range where the second patch image is set;

an image acquirer configured to acquire a luminance image representing the plurality of components and a depth image representing the plurality of components;

an image compositor configured to generate the stored component image by combining the luminance image and the depth image acquired by the image acquirer, and to generate, as the stored component image, a depth-weighted grayscale image obtained by weighting luminance of the luminance image by depth of the depth image; and a patch image generator configured to generate the first patch image from the stored component image and inputting the first patch image to the processor.

* * * * *